(12) United States Patent
Kamgaing et al.

(10) Patent No.: US 10,211,970 B2
(45) Date of Patent: Feb. 19, 2019

(54) MILLIMETER WAVE CMOS ENGINES FOR WAVEGUIDE FABRICS

(71) Applicant: INTEL CORPORATION, Santa Clara, CA (US)

(72) Inventors: Telesphor Kamgaing, Chandler, AZ (US); Georgios C. Dogiamis, Chandler, AZ (US); Sasha N. Oster, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/475,827

(22) Filed: Mar. 31, 2017

(65) Prior Publication Data

US 2018/0287773 A1    Oct. 4, 2018

(51) Int. Cl.
| | | |
|---|---|---|
| *H04B 10/00* | (2013.01) |
| *H04L 7/00* | (2006.01) |
| *H04L 7/033* | (2006.01) |
| *H04B 10/61* | (2013.01) |
| *H04B 10/548* | (2013.01) |

(52) U.S. Cl.
CPC ......... *H04L 7/0075* (2013.01); *H04B 10/548* (2013.01); *H04B 10/6165* (2013.01); *H04L 7/0331* (2013.01)

(58) Field of Classification Search
USPC ................................................. 398/135–139
See application file for complete search history.

(56) References Cited

U.S. PATENT DOCUMENTS

| | | | |
|---|---|---|---|
| 5,379,442 A | | 1/1995 | Allen et al. |
| 5,754,948 A | * | 5/1998 | Metze ...................... H04B 7/00 455/41.2 |
| 6,011,690 A | | 1/2000 | Hughes et al. |
| 6,043,538 A | * | 3/2000 | Allen ............. H01L 21/823425 257/355 |
| 6,664,562 B2 | * | 12/2003 | Weiss ..................... B82Y 20/00 257/21 |

(Continued)

OTHER PUBLICATIONS

U.S. Appl. No. 08/129,767, filed Sep. 30, 1993, abandoned.

*Primary Examiner* — Agustin Bello
(74) *Attorney, Agent, or Firm* — Grossman, Tucker, Perreault & Pfleger, PLLC

(57) ABSTRACT

The present disclosure is directed to systems and methods for communicating between rack mounted devices disposed in the same or different racks separated by distances of less than a meter to a few tens of meters. The system includes a CMOS first mm-wave engine that includes mm-wave transceiver circuitry, mm-wave MODEM circuitry, power distribution and control circuitry, and a mm-wave waveguide connector. The CMOS first mm-wave engine communicably couples to a CMOS second mm-wave engine that also includes mm-wave transceiver circuitry, mm-wave MODEM circuitry, power distribution and control circuitry, and a mm-wave waveguide connector. In some implementations, at least a portion of the mm-wave transceiver circuitry may be fabricated using III-V semiconductor manufacturing methods. The use of mm-wave communication techniques beneficially improves data integrity and increases achievable datarates, and reduces power costs.

25 Claims, 11 Drawing Sheets

(56) References Cited

U.S. PATENT DOCUMENTS

| | | | | |
|---|---|---|---|---|
| 6,967,347 | B2* | 11/2005 | Estes | B82Y 10/00 257/25 |
| 7,126,151 | B2* | 10/2006 | Estes | B82Y 10/00 257/25 |
| 7,373,107 | B1* | 5/2008 | Wesolowski | H04B 1/7183 361/785 |
| 7,933,573 | B2* | 4/2011 | Kondo | H04B 7/10 235/492 |
| 8,498,583 | B2* | 7/2013 | Ito | H04B 1/40 455/323 |
| 8,718,544 | B2* | 5/2014 | Kawasaki | H04B 1/04 370/223 |
| 8,824,529 | B2* | 9/2014 | Fukuda | H04B 1/40 375/219 |
| 8,897,184 | B2* | 11/2014 | Pettus | H04W 84/10 370/310 |
| 8,909,135 | B2* | 12/2014 | McCormack | H04B 1/18 455/39 |
| 8,995,935 | B2* | 3/2015 | Mihota | H04L 27/02 455/102 |
| 9,123,737 | B2* | 9/2015 | Haroun | H01L 23/66 |
| 9,191,263 | B2* | 11/2015 | McCormack | G06F 13/00 |
| 9,219,956 | B2* | 12/2015 | McCormack | H04R 3/00 |
| 9,234,797 | B1 | 1/2016 | Newman | G01J 3/28 |
| 9,426,660 | B2* | 8/2016 | McCormack | H04L 63/0428 |
| 9,474,099 | B2* | 10/2016 | McCormack | H04W 76/043 |
| 9,484,630 | B2* | 11/2016 | Haroun | H01L 23/66 |
| 9,515,365 | B2* | 12/2016 | McCormack | H01P 3/122 |
| 9,525,463 | B2* | 12/2016 | McCormack | G06F 13/00 |
| 9,531,425 | B2* | 12/2016 | McCormack | G09G 3/2096 |
| 9,537,794 | B2* | 1/2017 | Pettus | H04Q 1/15 |
| 9,553,353 | B2* | 1/2017 | Sovero | H01Q 1/24 |
| 9,559,753 | B2* | 1/2017 | McCormack | H04W 76/10 |
| 9,565,495 | B2* | 2/2017 | McCormack | H04R 3/00 |
| 9,588,292 | B2* | 3/2017 | Yu | G02B 6/1226 |
| 9,713,156 | B2* | 7/2017 | Petrick | H04B 7/0408 |
| 9,750,068 | B2* | 8/2017 | McCormack | H04W 76/023 |
| 9,787,349 | B2* | 10/2017 | McCormack | H04B 1/40 |
| 9,813,152 | B2* | 11/2017 | Pinguet | H04B 10/25 |
| 9,819,397 | B2* | 11/2017 | McCormack | H04B 5/0037 |
| 9,829,661 | B2* | 11/2017 | Pinguet | G02B 6/428 |
| 9,853,696 | B2* | 12/2017 | McCormack | H04B 5/02 |
| 9,894,524 | B2* | 2/2018 | McCormack | H04W 12/08 |
| 9,900,054 | B2* | 2/2018 | McCormack | H04B 5/0031 |
| 2002/0061073 | A1* | 5/2002 | Huang | H04L 1/0003 375/295 |
| 2002/0080087 | A1* | 6/2002 | Takatori | H01Q 1/007 343/893 |
| 2002/0165002 | A1* | 11/2002 | Kolinko | H01Q 1/125 455/500 |
| 2003/0022694 | A1* | 1/2003 | Olsen | G01V 8/005 455/562.1 |
| 2005/0027890 | A1* | 2/2005 | Nelson | G06F 3/023 709/250 |
| 2006/0038168 | A1* | 2/2006 | Estes | B82Y 10/00 257/25 |
| 2006/0273973 | A1* | 12/2006 | Chandler | H01Q 3/34 343/757 |
| 2007/0027948 | A1* | 2/2007 | Engebretsen | G06F 1/181 709/203 |
| 2008/0002652 | A1* | 1/2008 | Gupta | H01Q 1/2291 370/338 |
| 2008/0218413 | A1* | 9/2008 | Li | H04B 7/04 342/367 |
| 2011/0029545 | A1 | 2/2011 | Clapper et al. | |
| 2011/0075581 | A1* | 3/2011 | Mihota | H04B 7/0682 370/252 |
| 2011/0199972 | A1* | 8/2011 | Warke | H01Q 3/26 370/328 |
| 2014/0233460 | A1* | 8/2014 | Pettus | H04Q 1/15 370/328 |
| 2014/0273833 | A1* | 9/2014 | McCormack | H04W 76/10 455/41.1 |
| 2014/0273852 | A1* | 9/2014 | McCormack | H04W 76/10 455/41.2 |
| 2015/0095543 | A1* | 4/2015 | Kubo | G06F 13/4022 710/313 |
| 2015/0236396 | A1* | 8/2015 | Tang | H01P 5/188 333/109 |
| 2017/0127465 | A1* | 5/2017 | McCormack | H04W 76/023 |
| 2017/0221032 | A1* | 8/2017 | Mazed | G06K 7/10722 |
| 2017/0295533 | A1* | 10/2017 | Warke | H04W 40/06 |
| 2017/0318618 | A1* | 11/2017 | McCormack | H04W 76/023 |
| 2017/0346552 | A1* | 11/2017 | Nagarajan | H04Q 11/0005 |

* cited by examiner

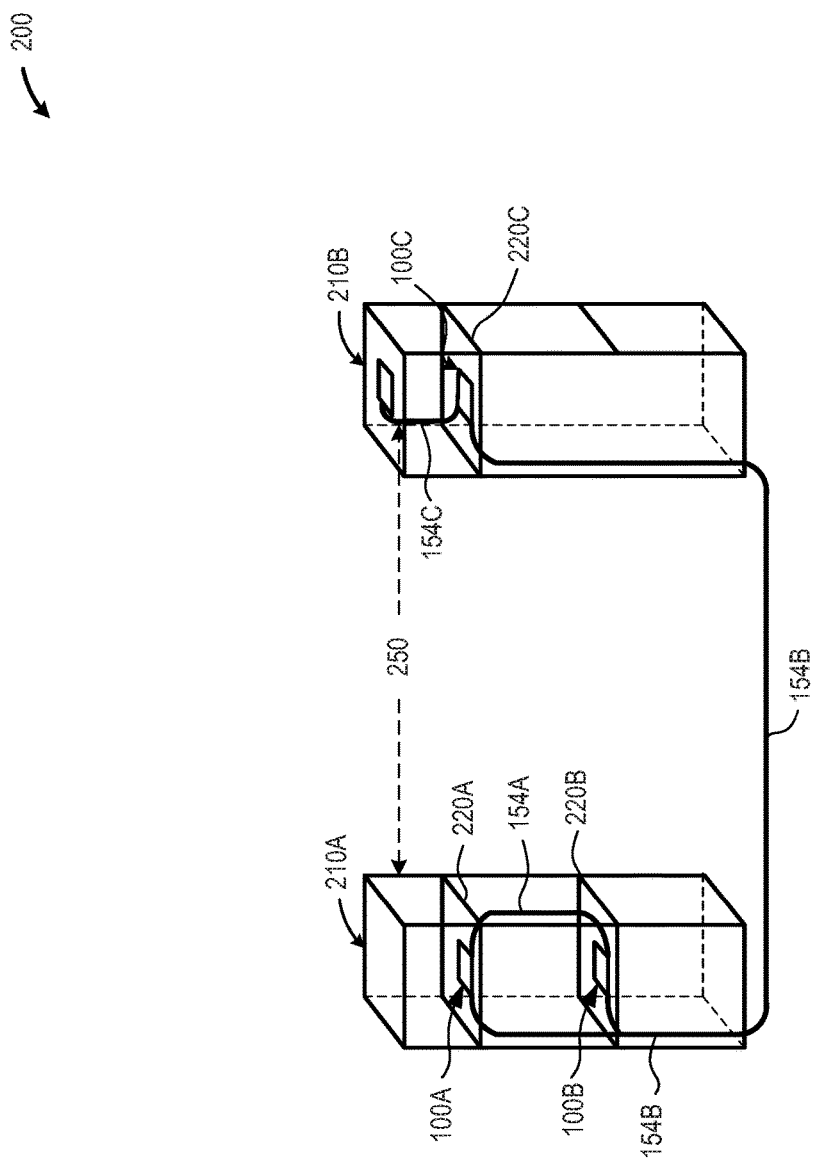

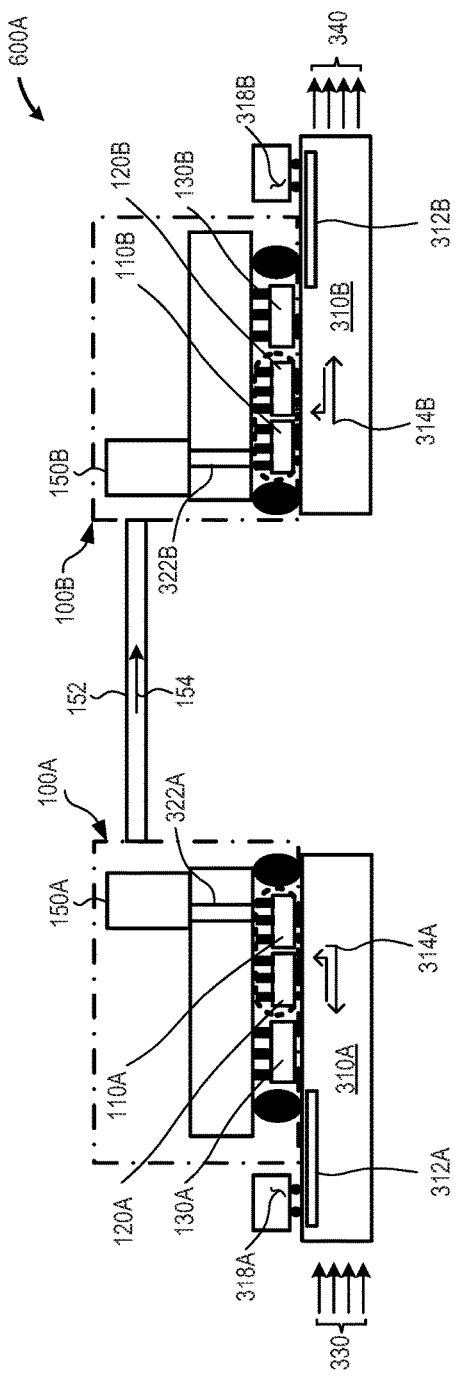
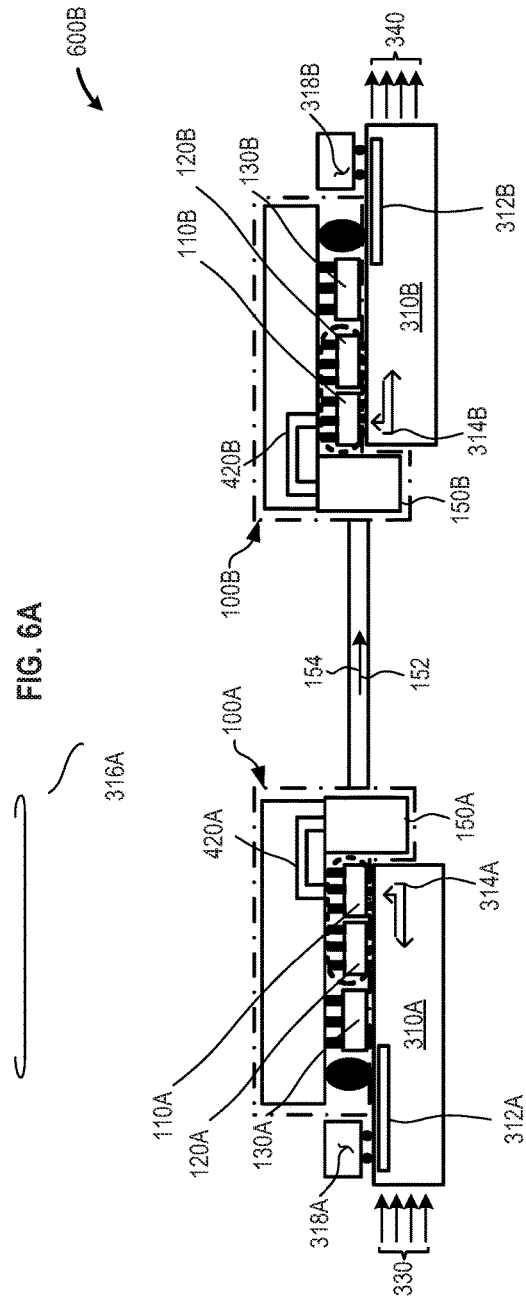
FIG. 6A
FIG. 6B

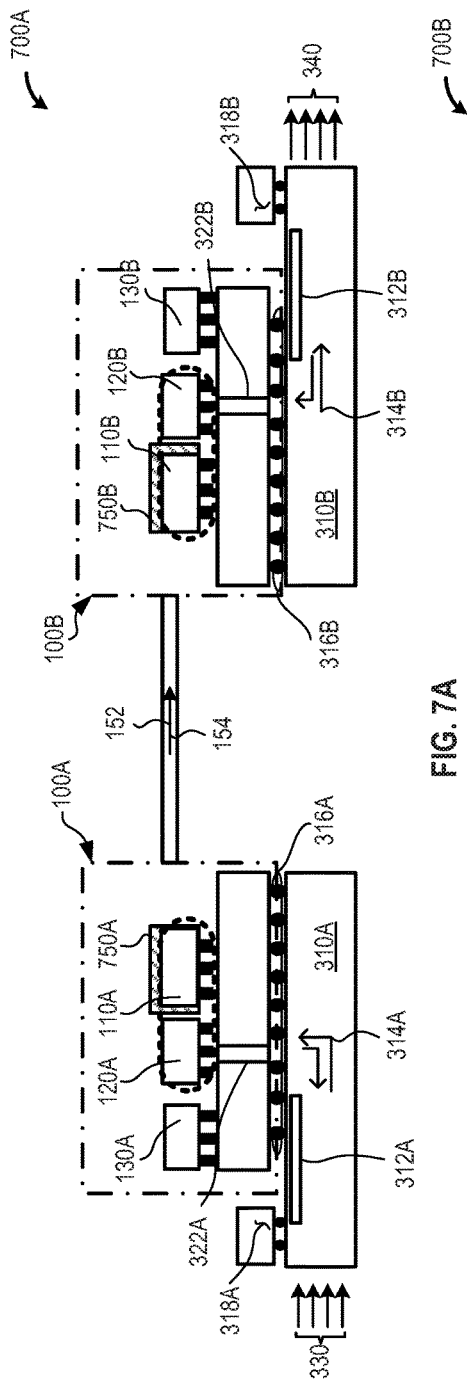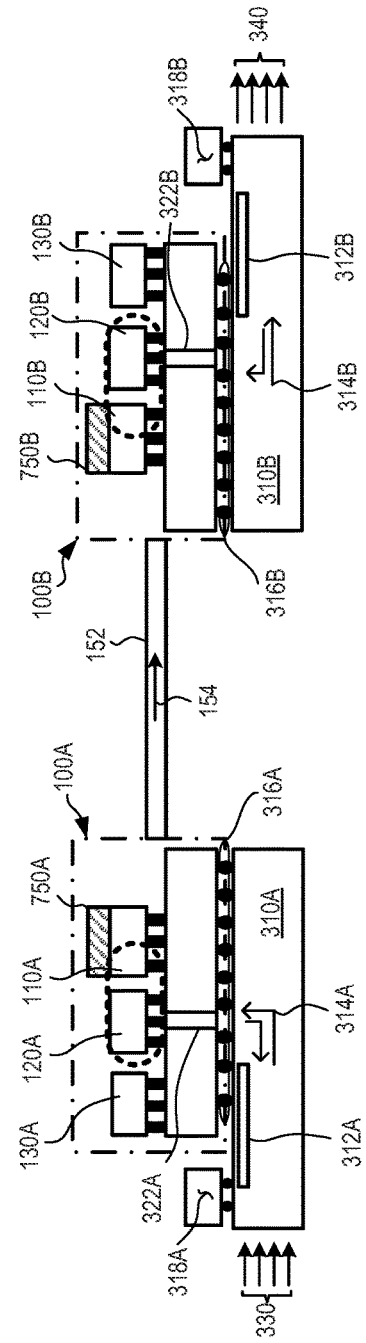

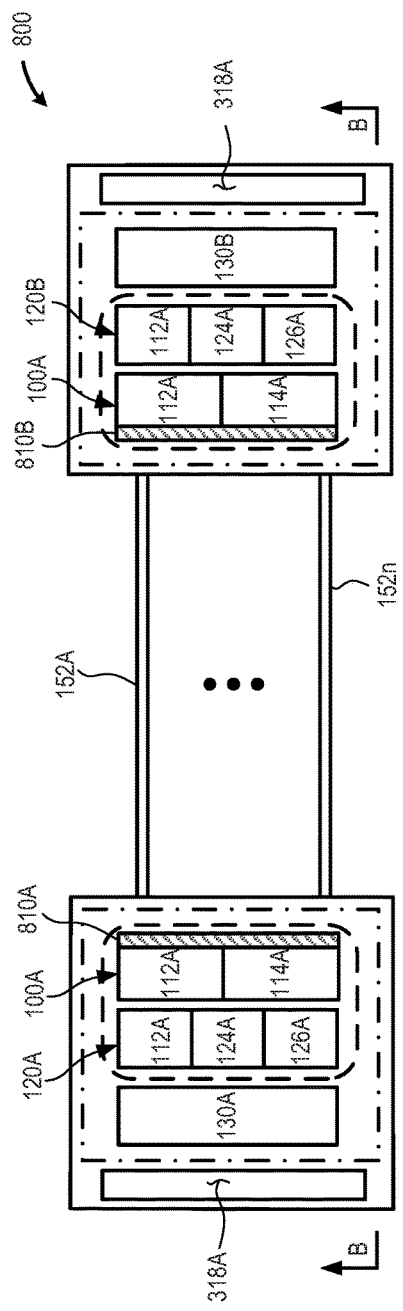
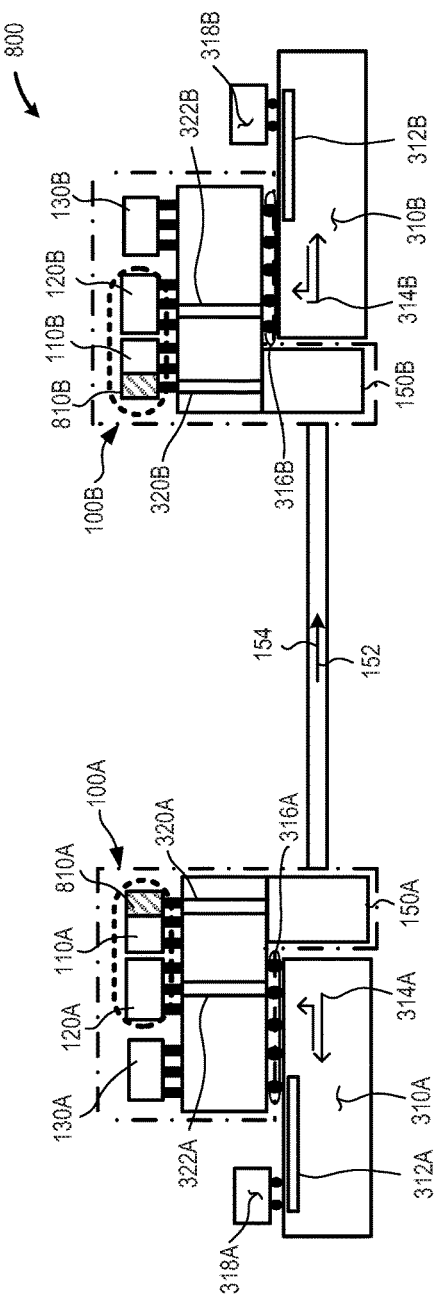
FIG. 8A
FIG. 8B

MILLIMETER WAVE CMOS ENGINES FOR WAVEGUIDE FABRICS

TECHNICAL FIELD

The present disclosure relates to systems and methods for transferring data using waveguides.

BACKGROUND

Today's servers utilize low frequency (e.g. sub-millimeter wave) high speed interconnects for rack-to-rack and blade-to-blade communication. This Process on Record (POR) electrical fabric provide limited data rate v. distance unless substantial equalization is used. An alternative solution consists of using an optical interconnect fabric that uses optical technologies, such as silicon photonics, and various semiconductor technologies along with optical fibers. This alternative solution provides an extremely high data rate over long distances. For medium distance communication within a server farm, the overhead power associated with the optical fabric is excessive, whereas the required error correction on traditional electrical fabric creates substantial latency issues (e.g., hundreds of nanoseconds). This makes both existing technologies (traditional electrical and optical) suboptimal for emerging Rack Scale Architecture RSA servers including high performance computing platforms where transmission distances typically range from 2 to 5 meters.

There are many interconnects within server and high performance computing (HPC) architectures today. These interconnects include within blade interconnects, within rack interconnects, and rack-to-rack or rack-to-switch interconnects. In today's architectures, short interconnects (for example, within rack interconnects and some rack-to-rack interconnects) are often achieved with electrical cables such as Ethernet cables, co-axial cables, or twin-axial cables, depending on the required data rate. For longer distances, an alternative solution consists of using an optical interconnect fabric that utilizes silicon photonics and various semiconductor technologies along with optical fibers. This alternative solution enables extremely high data rates over long distances. However, as new architectures emerge, such as 100 Gigabit Ethernet, traditional electrical connections are becoming prohibitively expensive and power-hungry to support the required data rates and transmission range. For example, to extend the reach of a cable or the given bandwidth on a cable, higher quality cables may need to be used or advanced equalization, modulation, and/or data correction techniques employed, all of which add power and/or latency to the system. For some distances and data rates required in proposed architectures, there is no viable electrical solution today. Optical transmission over fiber is capable of supporting the required data rates and distances, but at a severe power and cost penalty, especially for short to medium distances, such as a few meters.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

FIG. 2 is a schematic diagram of an illustrative system that includes a first rack, a second rack, each including at least one rack mounted device, and in which each of the rack mounted devices includes at least one mm-wave engine, in accordance with at least one embodiment described herein;

FIG. 6A is an elevation view of yet another example mm-wave waveguide communication system that includes a first mm-wave engine linked to a second mm-wave engine via one or more mm-wave waveguides coupled to mm-wave waveguide connectors, disposed on a first surface of the first mm-wave engine and the second mm-wave engine, respectively, in accordance with at least one embodiment described herein;

FIG. 6B is an elevation view of yet another example mm-wave waveguide communication system that includes a first mm-wave engine linked to a second mm-wave engine via one or more mm-wave waveguides coupled to mm-wave waveguide connectors disposed on a second surface of the first mm-wave engine and the second mm-wave engine, respectively, in accordance with at least one embodiment described herein;

FIG. 7A is an elevation view of yet another example mm-wave waveguide communication system that includes a first mm-wave engine linked to a second mm-wave engine via one or more mm-wave waveguides coupled to mm-wave waveguide connectors and disposed in, on, or about a first surface of the mm-wave transceiver circuitry, respectively, in accordance with at least one embodiment described herein;

FIG. 7B is an elevation view of yet another example mm-wave waveguide communication system that includes a first mm-wave engine linked to a second mm-wave engine via one or more mm-wave waveguides coupled to mm-wave waveguide connectors disposed in, on, or about a second surface of the mm-wave transceiver circuitry, respectively, in accordance with at least one embodiment described herein;

FIG. 8A is a plan view of an example mm-wave waveguide communication system that includes a first mm-wave engine that includes mm-wave transceiver circuitry at least a portion of which includes monolithically integrated III-V semiconductor transceiver circuitry communicably coupled via one or more mm-wave waveguides to a second mm-wave engine that also includes mm-wave transceiver circuitry at least a portion of which includes monolithically integrated III-V semiconductor transceiver circuitry, in accordance with at least one embodiment described herein;

FIG. 8B is an elevation view of the example mm-wave waveguide communication system depicted in FIG. 8A, in accordance with at least one embodiment described herein;

Figure 1:
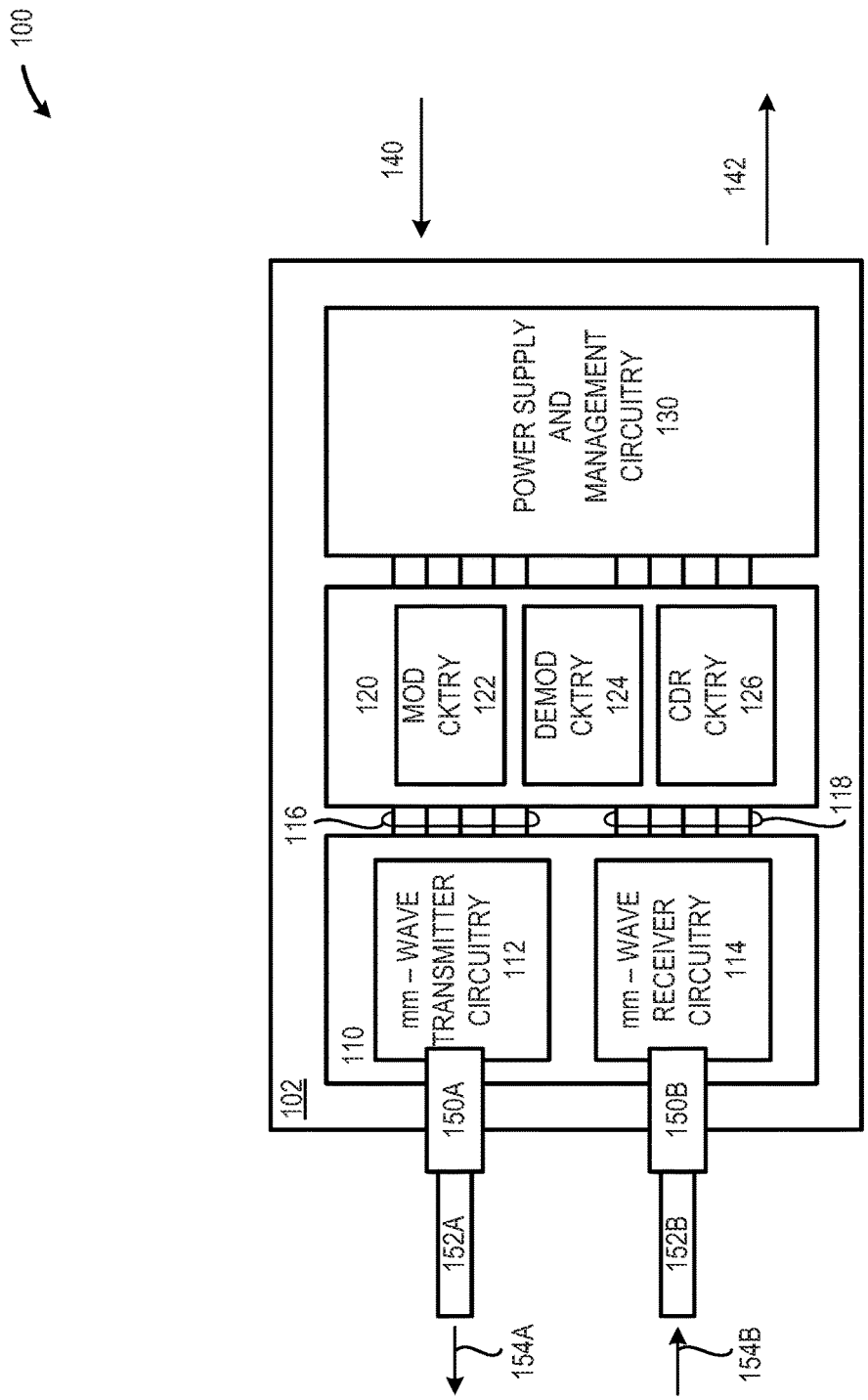
FIG. 1 is a block diagram of an illustrative mm-wave engine that includes mm-wave transmitter circuitry, mm-wave receiver circuitry, mm-wave modulation circuitry, mm-wave demodulation circuitry, clock data recovery circuitry, and power supply and management circuitry, in accordance with at least one embodiment described herein.

Although the following Detailed Description will proceed with reference being made to illustrative embodiments, many alternatives, modifications and variations thereof will be apparent to those skilled in the art.

DETAILED DESCRIPTION

The systems and methods described herein provide a cost and energy efficient solution for medium distance interconnects using mm-wave waveguides coupled to complementary metal oxide semiconductor (CMOS) packages that include a modulator/demodulator that converts a baseband signal to a mm-wave signal, a mm-wave transmitter and a mm-wave receiver. The systems and methods disclosed herein use an all-CMOS solution as the mm-wave engine for the waveguide fabric. The systems and methods disclosed herein describe the use of a III-V semiconductor technology in combination with the output of the mm-wave transmitter/transceiver to increase transmission power and improve transmission range. The systems and methods disclosed herein also describe the use of a III-V semiconductor technology in combination with the input at a mm-wave receiver to increase the reception signal-to-noise ratio.

Generally, this disclosure provides systems including a millimeter wave engine to transmit data in a server interconnect using waveguides. Such a system may support high data rates while requiring relatively little power or error correction, and may be formed in a number of orientations, allowing for flexibility in the setup of a server interconnect. Such a system may also include connecting waveguides that rotate through a desired angle, which in turn may allow a server package to send a signal through a waveguide bundle in any given direction without bending waveguides of the bundle.

A power-competitive data transmission means that can support very high data rates over short to medium distances would be extremely advantageous. The systems and methods disclosed herein provide waveguide connector systems and methods that may facilitate the transmission of data between blade servers ("blades") within a server rack or between collocated server racks using millimeter-waves (mm-waves) and sub-Terahertz (sub-THz) waves. As used herein, the term "mm-wave" refers to either or both the mm-wave electromagnetic spectrum that extends from about 30 gigahertz (GHz) to about 300 GHz and/or the sub-terahertz electromagnetic spectrum that extends from about 100 GHz to about 900 GHz. Thus, the term "mm-wave" may refer to electromagnetic energy at one or more frequencies within the mm-wave/sub-terahertz electromagnetic spectrum extending from 30 GHz to 900 GHz.

A complementary metal oxide semiconductor (CMOS) die mounted millimeter wave (mm-wave) package is provided. The package may include a substrate; CMOS mm-wave modulation circuitry operably coupled to the substrate, the mm-wave modulation circuitry to modulate a first baseband signal onto a first mm-wave carrier signal to provide a first signal; CMOS mm-wave demodulation circuitry operably coupled to the substrate, the mm-wave demodulation circuitry to demodulate a second baseband signal from a second mm-wave carrier signal; CMOS clock data recovery circuitry operably coupled to the substrate and communicably coupled to the CMOS mm-wave demodulation circuitry, the clock data recovery circuitry to recover timing information from the second baseband signal; CMOS mm-wave transmitter circuitry to: receive the first signal from the CMOS mm-wave modulation circuitry; and provide the first signal to a first mm-wave waveguide member; and CMOS mm-wave receiver circuitry.

A method of communicating via millimeter wave (mm-wave) signals using a complementary metal oxide semiconductor (CMOS) mm-wave package is provided. The method may include: modulating, via CMOS mm-wave modulation circuitry, a first baseband signal onto a first mm-wave carrier signal to provide a first signal; and transmitting, via CMOS mm-wave transmitter circuitry coupled to the CMOS mm-wave modulation circuitry, the first signal to a first mm-wave waveguide via a first mm-wave waveguide connector operably coupled to the CMOS mm-wave transmitter circuitry.

A system for communicating via millimeter wave (mm-wave) signals using a complementary metal oxide semiconductor (CMOS) mm-wave package is provided. The system may include: CMOS means for modulating a first baseband signal onto a first mm-wave carrier signal to provide a first signal; CMOS means for transmitting the first signal to a first mm-wave waveguide via an operably coupled first mm-wave waveguide connector; CMOS means for receiving a second signal including a second baseband signal modulated onto a second mm-wave carrier signal; CMOS means for demodulating the second baseband signal from the second mm-wave carrier signal; and CMOS means for synchronizing at least one timing signal to the received second signal.

The terms "horizontal" and "vertical" as used in any embodiment herein are not used as terms of limitation, but merely as relative terms to simplify descriptions of components of those embodiments. The terms may be substituted or interchanged with no impact on the intended meaning or scope of the description of any embodiment. For example, a component described as vertical may be horizontal if the system to which the component is attached is rotated through an angle of 90°. The terms "first" and "second" are similarly used herein as relative terms for simplification purposes only, and may be substituted or interchanged with no impact on intended meaning or scope. The terms "height," "width" and "depth" are similarly used herein as relative terms for simplification purposes only, and may be substituted or interchanged with no impact on intended meaning or scope. The term "package" is used herein to describe a package substrate. The package may be any kind of package substrate including organic, plastic, ceramic, or silicon used for a semiconductor integrated circuit.

As used herein the terms "top," "bottom," "lowermost," and "uppermost" when used in relationship to one or more elements are intended to convey a relative rather than absolute physical configuration. Thus, an element described as an "uppermost element" or a "top element" in a device may instead form the "lowermost element" or "bottom element" in the device when the device is inverted. Similarly, an element described as the "lowermost element" or "bottom element" in the device may instead form the "uppermost element" or "top element" in the device when the device is inverted.

As used herein, the term "logically associated" when used in reference to a number of objects, systems, or elements, is intended to convey the existence of a relationship between the objects, systems, or elements such that access to one object, system, or element exposes the remaining objects, systems, or elements having a "logical association" with or to the accessed object, system, or element. An example "logical association" exists between relational databases where access to an element in a first database may provide information and/or data from one or more elements in a number of additional databases, each having an identified relationship to the accessed element. In another example, if "A" is logically associated with "B," accessing "A" will expose or otherwise draw information and/or data from "B," and vice-versa.

FIG. 1 is a block diagram of an illustrative mm-wave engine 100 that includes mm-wave transmitter circuitry 112, mm-wave receiver circuitry 114, mm-wave modulation circuitry 122, mm-wave demodulation circuitry 124, clock data recovery ("CDR") circuitry 126, and power supply and management circuitry 130, in accordance with at least one embodiment described herein. At least some of the components forming the mm-wave engine 100 may be physically coupled to a common substrate material that forms a semiconductor package 102. As depicted in FIG. 1, in embodiments, at least some of the mm-wave modulation circuitry 122, the mm-wave demodulation circuitry 124, and the CDR circuitry 126 may be combined to provide mm-wave MODEM circuitry 120. Also, as depicted in FIG. 1, in embodiments, at least some of the mm-wave transmitter circuitry 112 and the mm-wave receiver circuitry 114 may be combined to provide mm-wave transceiver circuitry 110. One or more conductors 116 may be routed in, on, or about the package 102 to communicably couple the mm-wave modulation circuitry 122 with the mm-wave transmitter circuitry 112. One or more conductors 118 may be routed in, on, or about the package 102 to communicably couple the mm-wave demodulation circuitry 124 with the mm-wave receiver circuitry 114. In some embodiments, the building blocks 110, 120 and 130 may be implemented and the same die and therefore be able to communicate with each other without using conductors on the package substrate.

The semiconductor package 102 may include one or more mm-wave waveguide connectors 150A-150n (collectively, "waveguide connectors 150"). A respective mm-wave waveguide 152A-152n may be operably and communicably coupled to each of the mm-wave waveguide connectors 150A-150n. Although not depicted in FIG. 1, each of the mm-wave waveguides 152 and/or each of the mm-wave waveguide connectors 150 may include a separate or integral mm-wave launcher to transmit and/or receive one or more signals at mm-wave frequencies.

While FIG. 1 depicts a mm-wave engine 100 that includes two waveguide connectors 150A and 150B coupled to respective waveguides, 152A and 152B, in other embodiments mm-wave engine 100 may be connected to a plurality of waveguides 152A-152n or to only a single waveguide 152. Similarly, mm-wave engine 100 may utilize only a single waveguide connector 150 to connect or otherwise operably couple to a plurality of waveguides 152A-152n. In other embodiments, mm-wave engine 100 may be connected to a plurality of waveguide connectors 150A-150n, wherein each waveguide connector 150 allows mm-wave engine 100 to be operably coupled to any number of waveguides 152. For example, the mm-wave engine 100 may be connected to a first, second, and third waveguide connector 150A, 150B, 150C, wherein the first waveguide connector 150A allows mm-wave engine 100 to operably connect to a plurality of waveguides (e.g., ten) 152A-152J, the second waveguide connector 150B allows mm-wave engine 100 to operably connect to only a single waveguide 152K, and the third waveguide connector 150C does not allow mm-wave engine 100 to operably connect to any waveguides. Further, mm-wave engine 100 may operate the mm-wave transmitter 122 at a plurality of frequencies or polarizations within the mm-wave frequency band. In such instances, the mm-wave transmitter 122 may provide a single frequency or polarization to each waveguide 152 or a plurality of frequencies and/or polarizations to each waveguide 152.

The mm-wave transmitter circuitry 112 may include any number and/or combination of devices and/or systems capable of receiving information and/or data from the mm-wave modulation circuitry 122 and generating a first mm-wave output signal 154A that includes all or a portion of the information and/or data received from the mm-wave modulation circuitry 122. The first mm-wave output signal 154A propagates along the mm-wave waveguide 152A to at least one destination location. In embodiments, the mm-wave transmitter circuitry 112 may be communicably coupled to one or more mm-wave launchers (microstrip-to-slot launcher, patch launcher, etc.) capable of launching or otherwise causing the propagation and/or reception of the first mm-wave signal 154A to/from the mm-wave waveguide 152A.

The die containing the mm-wave transmitter circuitry 112 may be fabricated using any current or future developed CMOS manufacturing technique, such as a photolithographic technique. For example, the die containing the mm-wave transmitter circuitry 112 may include: a 65 nanometer (nm) node CMOS; a 40 nm node CMOS; a 32 nm node CMOS; a 28 nm node CMOS; or a 22 nm node CMOS. In some implementations, at least a portion of the mm-wave transmitter circuitry 112 may be fabricated using III-V semiconductor manufacturing techniques. Such III-V semiconductor manufacturing techniques may include fabrication of all or a portion of the mm-wave transmitter die using one or more III-V materials such as: boron nitride, boron phosphide, boron arsenide, aluminum nitride, aluminum phosphide, aluminum arsenide, aluminum antimonide, gallium nitride, gallium phosphide, gallium arsenide, gallium antimonide, indium nitride, indium phosphide, indium arsenide, and indium antimonide. The use of III-V semiconductor materials in the mm-wave transmitter die beneficially increases the signal strength and transmission range of the first mm-wave output signal 154A generated by the mm-wave transmitter circuitry 112. It may also increase the maximum frequency of operation of the transistors. The mm-wave receiver circuitry 114 may include any number and/or combination of devices and/or systems capable of receiving a second mm-wave signal 154B carrying information and/or data and propagating along one or more mm-wave waveguides 152B. The mm-wave receiver circuitry 114 passes the second mm-wave signal 154B that includes the received information and/or data to the mm-wave demodulation circuitry 124. In embodiments, the mm-wave receiver circuitry 114 may be communicably coupled to one or more mm-wave launchers (microstrip-to-slot launcher, patch launcher, etc.) capable of propagating and/or receiving the second mm-wave signal 154B to/from the mm-wave waveguide 152B. In some embodiments, the mm-wave receiver circuitry 114 may be communicably coupled to the same or different mm-wave launcher than the mm-wave transmitter circuitry 112.

The die containing the mm-wave receiver circuitry 114 may be fabricated using any current or future developed CMOS manufacturing technique. For example, the die containing the mm-wave receiver circuitry 114 may include: a 65 nanometer (nm) node CMOS; a 40 nm node CMOS; a 32 nm node CMOS; a 28 nm node CMOS; or a 22 nm node CMOS. In some implementations, at least a portion of the mm-wave receiver circuitry die may be fabricated using a III-V semiconductor manufacturing technique. Example III-V semiconductor manufacturing techniques include fabricating of all or a portion of the mm-wave receiver 114 using one or more III-V materials such as: boron nitride, boron phosphide, boron arsenide, aluminum nitride, aluminum phosphide, aluminum arsenide, aluminum antimonide, gallium nitride, gallium phosphide, gallium arsenide, gallium antimonide, indium nitride, indium phosphide, indium arsenide, and indium antimonide. The use of III-V materials in the mm-wave receiver die beneficially improves the signal-to-noise ratio of the second mm-wave signal 154B received from the mm-wave waveguide 152B. In some implementations, at least some of the mm-wave transmitter circuitry 112 and at least some of the mm-wave receiver circuitry 114 may be fabricated on a common (i.e., a single) die or otherwise combined to provide mm-wave transceiver circuitry 110.

The mm-wave modulation circuitry 122 may include any number and/or combination of devices and/or systems capable of receiving a baseband signal 140 that includes information and/or data from one or more system components, modulating or otherwise combining the received baseband signal 140 with a mm-wave carrier wave, and passing the modulated signal 116, including at least a portion of the information and/or data in the baseband signal 140, to the mm-wave transmitter circuitry 112. In some implementations, the mm-wave modulation circuitry 122 may modulate, mix, or otherwise combine the information and/or data provided by the baseband signal 140 on a mm-wave carrier wave having a single frequency and/or polarization. The mm-wave modulation circuitry 122 may modulate the baseband signal onto a mm-wave carrier signal using any currently available or future developed modulation technique, including, but not limited to: binary phase shift keying (BPSK), quadrature amplitude modulation (QAM), frequency-shift keying modulation (FSK), amplitude-shift keying modulation (ASK), on/off keying modulation (OOK), quadrature phase shift keying modulation (QPSK), Space Shift Keying Modulation (SSK) and similar. In some implementations, the mm-wave modulation circuitry 122 may modulate the information and/or data provided by the baseband signal 140 on a mm-wave carrier signal having multiple frequencies and/or multiple polarizations. The die containing the mm-wave modulation circuitry 122 may be fabricated using any current or future developed CMOS manufacturing technique. For example, the die containing the mm-wave modulation circuitry 122 may include: a 65 nanometer (nm) node CMOS; a 40 nm node CMOS; a 32 nm node CMOS; a 28 nm node CMOS; or a 22 nm node CMOS.

The mm-wave demodulation circuitry 124 may include any number and/or combination of devices and/or systems capable of receiving a mm-wave input signal 118 that includes information and/or data from the mm-wave receiver circuitry 114 and generating a baseband signal 142 that includes at least a portion of the information and/or data included in the mm-wave signal 118 received from the mm-wave receiver circuitry 114. In some implementations, the mm-wave demodulation circuitry 124 may demodulate the information and/or data included in the received mm-wave input signal 118 from a mm-wave carrier wave having a single frequency and/or polarization. In some implementations, the mm-wave demodulation circuitry 124 may demodulate the information and/or data included in the received mm-wave input signal 118 from a mm-wave carrier signal having multiple frequencies and/or multiple polarizations. The die containing the mm-wave demodulation circuitry 124 may be fabricated using any current or future developed CMOS manufacturing technique. For example, the die containing the mm-wave demodulation circuitry 124 may include: a 65 nanometer (nm) node CMOS; a 40 nm node CMOS; a 32 nm node CMOS; a 28 nm node CMOS; or a 22 nm node CMOS. In some implementations, at least some of the mm-wave modulation circuitry 122 and at least some of the mm-wave demodulation circuitry 124 may be fabricated on a common (i.e., a single) die or otherwise combined to provide mm-wave MODEM circuitry (mm-wave modulator/demodulator circuitry) 120.

The CDR circuitry 126 may be communicably coupled to the mm-wave demodulation circuitry 124 and may include any number and/or combination of devices and/or systems capable of receiving an asynchronous baseband signal from the mm-wave demodulation circuitry 124 and generates a synchronous baseband output signal that may be forwarded to one or more system components, such as a serializer/deserializer (SERDES). The CDR circuitry 126 may additionally or alternatively be communicably coupled to the mm-wave modulation circuitry 122. In some implementations, the CDR circuitry 126 may include at least one phase-locked loop (PLL) tuner to provide the synchronous baseband output signal 142. The die containing the CDR circuitry 126 may be fabricated using any current or future developed CMOS manufacturing technique. For example, the die containing the CDR circuitry 126 may include: a 65 nanometer (nm) node CMOS; a 40 nm node CMOS; a 32 nm node CMOS; a 28 nm node CMOS; or a 22 nm node CMOS. In some implementations, at least some of the mm-wave modulation circuitry 122, at least some of the mm-wave demodulation circuitry 124, and at least some of the CDR circuitry 126 may be fabricated on a common (i.e., a single) die or otherwise combined to provide a mm-wave MODEM circuitry 120 that includes communicably coupled CDR circuitry 126.

The power supply and management circuitry 130 may include any number and/or combination of devices and/or systems capable of receiving power from one or more external sources and converting the received external power to one or more operating voltage levels useful to the mm-wave engine 100. In some embodiments, the power supply and management circuitry 130 may receive power from an external source such as a server blade to which the mm-wave engine 100 is operably coupled. Power supply and management circuitry 130 may convert the received platform power into different voltage levels required by the other components, such as the mm-wave transceiver circuitry 110 and the mm-wave MODEM circuitry 120. For example, the mm-wave transceiver circuitry 110 may require a drain operating voltage above 1.8 V with gate biasing in the range of several hundred millivolts (200 mV, 400 mV, etc.). The die containing the power supply and management circuitry 130 may be fabricated using any current or future developed CMOS manufacturing technique. For example, the die containing the power supply and management circuitry 130 may include: a 65 nanometer (nm) node CMOS; a 40 nm node CMOS; a 32 nm node CMOS; a 28 nm node CMOS; or a 22 nm node CMOS. In some implementations, the transceiver circuitry 110, the MODEM circuitry 120, and the power supply and management circuitry 130 may be fabricated on a common (i.e., a single) die or otherwise combined to provide the mm-wave engine 100.

The mm-wave waveguide connectors 150 may include any number and/or combination of devices and/or systems capable of operably coupling one or more waveguides 152 to at least one of: the mm-wave transmitter circuitry 112, the mm-wave receiver circuitry 114, or the mm-wave transceiver circuitry 110. In some implementations, the mm-wave waveguide connectors 150 may include one or more friction fit connectors in which the mm-wave waveguides 152 are inserted and retained based upon the friction generated between the mm-wave waveguide 152 and the mm-wave waveguide connector 150. In some implementations, the mm-wave waveguide connectors 150 may include one or more mm-wave waveguide attachment and/or mm-wave waveguide alignment features, such as one or more latches, tabs, or similar that detachably or non-detachably couple to the mm-wave waveguide 152. In some implementations, at least some of the mm-wave waveguide connectors 150 may be disposed in, on, or, about the package containing the mm-wave transmitter circuitry 112, the package containing the mm-wave receiver circuitry 114, or the package containing the mm-wave transceiver circuitry 110. In some implementations, at least some of the mm-wave waveguide connectors 150 may be disposed in, on, or, about the substrate on which the mm-wave transmitter circuitry 112, the mm-wave receiver circuitry 114, or the mm-wave transceiver circuitry 110 are formed. The mm-wave waveguides 152A-152n may include any number and/or combination of waveguides including, but not limited to, dielectric filled conductive waveguides, dielectric waveguides, hollow conductive waveguides, hollow dielectric waveguides, or combinations thereof. The dimensions of the waveguides 152 may be selected based at least in part on the operating frequency/frequencies of the carrier mm-wave, the materials of construction, and the type of construction of the waveguide 152. The cross sectional geometry of the waveguides 152 could be rectangular, square, circular, elliptical, or other based at least in part on the operating frequency/frequencies of the carrier mm-wave, the materials of construction, and the type of construction of the waveguide 152.

FIG. 2 is a schematic diagram of an illustrative system 200 that includes a first rack 210A, a second rack 210B, each including at least one rack mounted device (e.g., a blade) 220A-220n (collectively "rack mounted devices 220"), and in which each of the rack mounted devices includes at least one mm-wave engine 100A-100n, in accordance with at least one embodiment described herein. Each of the racks 210 typically holds a plurality of rack mounted devices 220 (e.g., 8, 12, or 16 rack mounted devices 220).

As depicted in FIG. 2, in embodiments, a mm-wave waveguide 154A may communicably couple a first mm-wave engine 100A disposed on a first rack mounted device 220A to a second mm-wave engine 100B disposed on a second rack mounted device 220B, where the first rack mounted device 220A and the second rack mounted device 220B are mounted in the same rack 210A. In a similar manner, any number of mm-wave waveguides 154 may communicably couple any number of mm-wave engines 100 within the same rack 210. In some implementations, one or more mm-wave waveguides 154C may communicably couple one or more mm-wave engines 100C to one or more top-of-rack (ToR) mounted switches 230 or similar devices.

Such switches may also be disposed at other locations including disposed in the middle of a row of racks 210, at the end of a row of racks 210, etc.

As also depicted in FIG. 2, a mm-wave waveguide 154B may communicably couple the first mm-wave engine 100A and the second mm-wave engine 100B, both disposed on rack mounted devices 220 in a first rack 210A with a third mm-wave engine 100C disposed on a rack mounted device 220C in a second rack 210B. In a similar manner, any number of mm-wave waveguides 154 may communicably couple any number of mm-wave engines 100 in different racks 210A-210n. When used for inter-rack communication, the racks 210A-210n may be disposed at a distance 250 of from less than a meter apart to tens of meters apart.

Figure 3A:
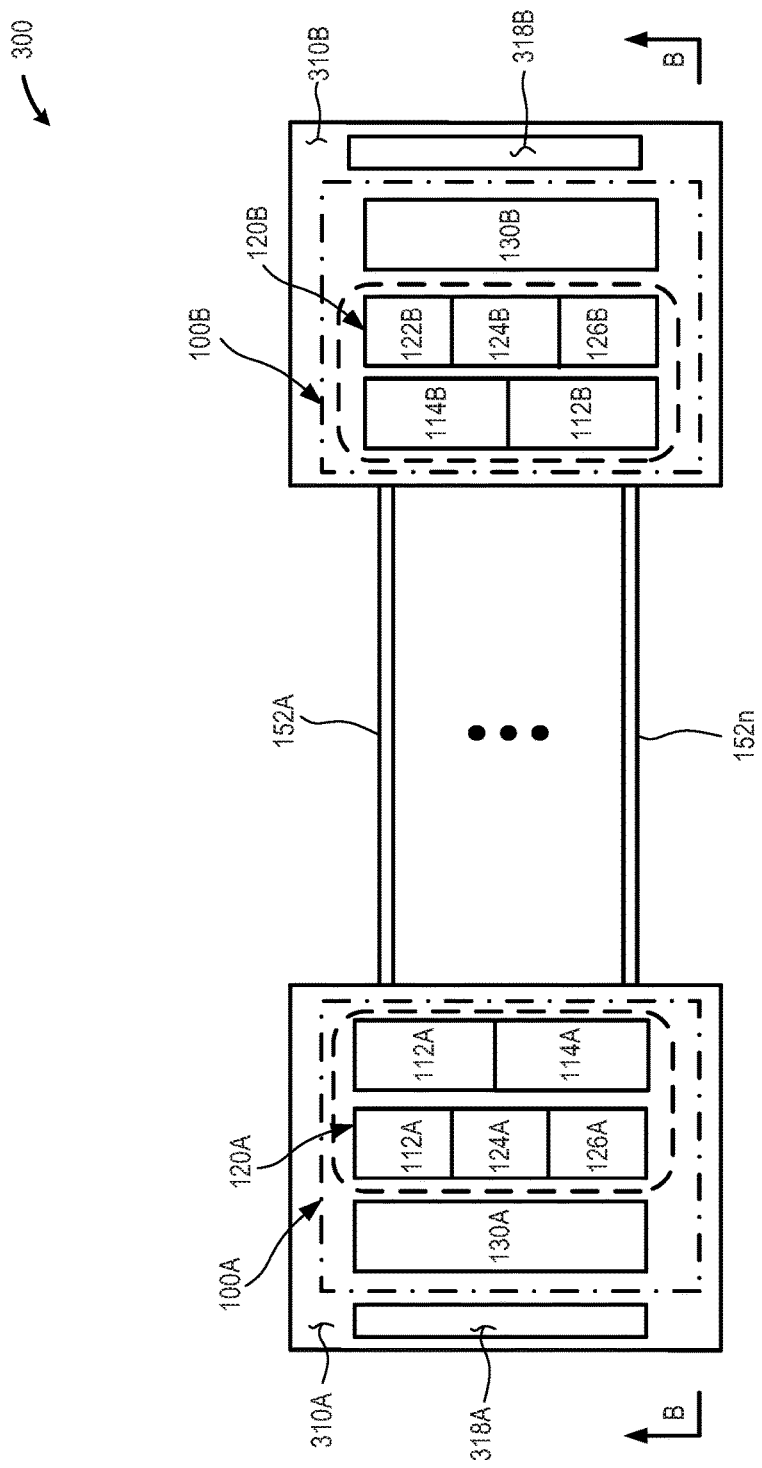
FIG. 3A is a plan view of an example mm-wave waveguide communication system that includes a first mm-wave engine communicably coupled to a second mm-wave engine via one or more mm-wave waveguides, in accordance with at least one embodiment described herein.
Figure 3B:
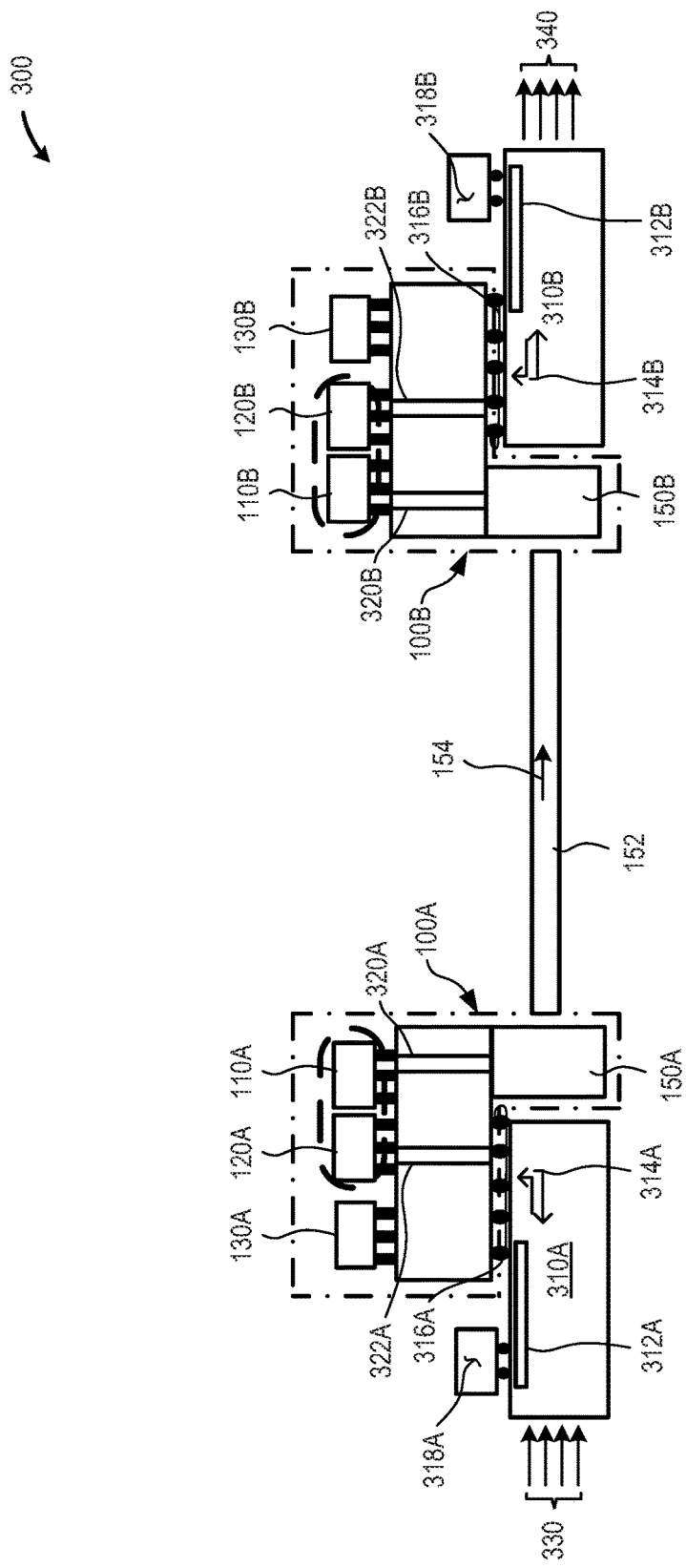
FIG. 3B is an elevation view of the example mm-wave waveguide communication system depicted in FIG. 3A, in accordance with at least one embodiment described herein.

FIG. 3A is a plan view of an example mm-wave waveguide communication system 300 that includes a first mm-wave engine 100A communicably coupled to a second mm-wave engine 100B via one or more mm-wave waveguides 152A-152n, in accordance with at least one embodiment described herein. FIG. 3B is an elevation view of the example mm-wave waveguide communication system 300 depicted in FIG. 3A, in accordance with at least one embodiment described herein. In embodiments, the first mm-wave engine 100A and the second mm-wave engine 100B may be disposed in the same rack 210. In other embodiments, the first mm-wave engine 100A may be disposed in a first rack 210A and the second mm-wave engine 100B may be disposed in a second rack 210B. Although the following discussion assumes the first mm-wave engine 100A is functioning as a transmitter and the second mm-wave engine 100B is functioning as a receiver for ease of discussion, those of skill in the art will readily appreciate that the first mm-wave engine 100A and the second mm-wave engine 100B may, at times, function as a transmitter, a receiver, or as both a transmitter and a receiver.

The first mm-wave engine 100A may be disposed proximate and communicably coupled via one or more first level interconnects 316A to a substrate 310A to which any number of systems or devices may also be coupled. For example, the substrate 310A may include one or more processors, controllers, or similar semiconductor devices that generate one or more periodic, intermittent, continuous, or aperiodic data streams that includes information and/or data for communication to the second mm-wave engine 100B. In some implementations, the first mm-wave engine 100A may be communicably coupled via one or more traces 312 A to serializer/deserializer ("SERDES") circuitry 318A that receives a plurality of baseband signals (e.g., signals generated by one or more processors or controllers) 330 as an input and generates a serialized output signal that includes information and/or data carried by the received baseband signals. In some implementations, the serialized output signal produced by the SERDES circuitry 318A may be communicated via one or more interconnects 322A to the mm-wave MODEM circuitry 120A in the first mm-wave engine 100A.

As depicted in FIG. 3B, the mm-wave transceiver circuitry 110A, the mm-wave MODEM circuitry 120A, and the mm-wave power supply and controller circuitry 130A may be disposed on a first (e.g. upper) surface of the mm-wave engine 100A and the mm-wave waveguide connector 150A may be disposed on a second (e.g., lower) surface of the mm-wave engine 100A. One or more conductors 320A may communicably couple the mm-wave transceiver circuitry 110A to the mm-wave waveguide connector 150A.

The second mm-wave engine 100B may be disposed proximate and communicably coupled via one or more first level interconnects 316B to a substrate 310B to which any number of systems or devices may also be coupled. For example, the substrate 310B may include one or more processors, controllers, or similar semiconductor devices that generate one or more periodic, intermittent, continuous, or aperiodic data streams that includes information and/or data for communication to the first mm-wave engine 100A. In some implementations, the mm-wave receiver circuitry 114B receives a mm-wave signal 154 from the first mm-wave engine 100A via one or more mm-wave waveguides 152. The received mm-wave signal 154 includes information and/or data useful to one or more local or remote components, devices, or systems communicably coupled to the substrate 310B. The mm-wave receiver 114B passes the received signal to the mm-wave demodulation circuitry 124B in the mm-wave MODEM 120B. The mm-wave demodulation circuitry 124B separates the received serialized baseband signal containing the data and/or information from the mm-wave carrier signal and generates a serialized output signal. The serialized output signal 142B may be directed via one or more conductors 322B and/or one or more traces 312B to a SERDES 318B disposed on the substrate 310B. The SERDES 312B separates the serialized output signal 142B into a plurality of baseband signals 340.

As depicted in FIG. 3B, the mm-wave transceiver 110B, the mm-wave MODEM 120B, and the mm-wave power supply and controller circuitry 130B may be disposed on a first (e.g. upper) surface of the second mm-wave engine 100B and the mm-wave waveguide connector 150B may be disposed on a second (e.g., lower) surface of the second mm-wave engine 100B. One or more conductors 320B may communicably couple the mm-wave transceiver circuitry 110B to the mm-wave waveguide connector 150B.

Figure 4:
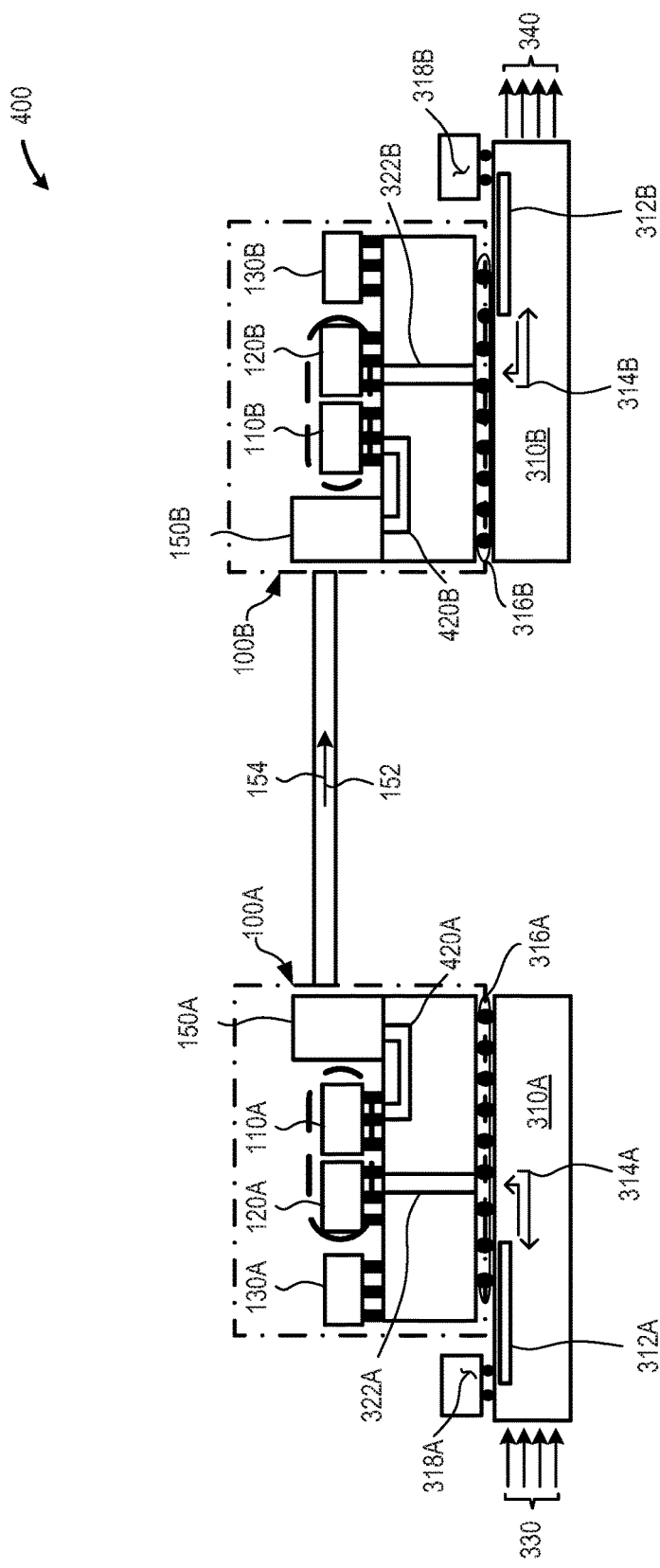
FIG. 4 is an elevation view of another example mm-wave waveguide communication system that includes a first mm-wave engine communicably coupled to a second mm-wave engine via one or more mm-wave waveguides, in accordance with at least one embodiment described herein.

FIG. 4 is an elevation view of another example mm-wave waveguide communication system 400 that includes a first mm-wave engine 100A communicably coupled to a second mm-wave engine 100B via one or more mm-wave waveguides 152A-152n, in accordance with at least one embodiment described herein. In embodiments, the first mm-wave engine 100A and the second mm-wave engine 100B may be disposed in the same rack 210. In other embodiments, the first mm-wave engine 100A may be disposed in a first rack 210A and the second mm-wave engine 100B may be disposed in a second rack 210B. Although for ease of discussion the following discussion assumes the first mm-wave engine 100A is functioning as a transmitter and the second mm-wave engine 100B is functioning as a receiver, those of skill in the art will readily appreciate that the first mm-wave engine 100A and the second mm-wave engine 100B may, at times, function as a transmitter, a receiver, or as both a transmitter and a receiver.

As depicted in FIG. 4, the mm-wave transceiver circuitry 110A, the mm-wave MODEM circuitry 120A, the mm-wave power supply and controller circuitry 130A, and the mm-wave waveguide connector 150A may be disposed on a first (e.g. upper) surface of the mm-wave engine 100A. One or more conductors 420A may communicably couple the mm-wave transceiver circuitry 110A to the mm-wave waveguide connector 150A. In embodiments, a plurality of input signals 330, each carrying information and/or data may be received by the SERDES 312A. The SERDES 312A generates a serialized output signal 314A that is communicated to the mm-wave MODEM circuitry 120A where the serialized output signal 314A is modulated onto a mm-wave carrier wave to provide a mm-wave output signal 154. The mm-wave output signal 154 is propagated into the mm-wave waveguide 152 via the mm-wave transceiver circuitry 110A.

The second mm-wave engine 100B may include a mm-wave transceiver 110B, mm-wave MODEM 120B, mm-wave power supply and controller circuitry 130B, and mm-wave waveguide connector 150B disposed on a first (e.g. upper) surface of the substrate on which the second mm-wave engine 100B is disposed. One or more conductors 420B may communicably couple the mm-wave transceiver circuitry 110B to the mm-wave waveguide connector 150B. In embodiments, the mm-wave input signal 154 is received via the mm-wave transceiver circuitry 110B. The mm-wave MODEM circuitry 120B receives the input signal 154 and separates the serialized signal from the mm-wave carrier signal. The mm-wave MODEM circuitry 120B forwards the serialized signal to the SERDES 312B. The SERDES 312B generates a plurality of baseband output signals 340, each including at least a portion of the information and/or data included in respective ones of the plurality of input signals 330.

Figure 5:
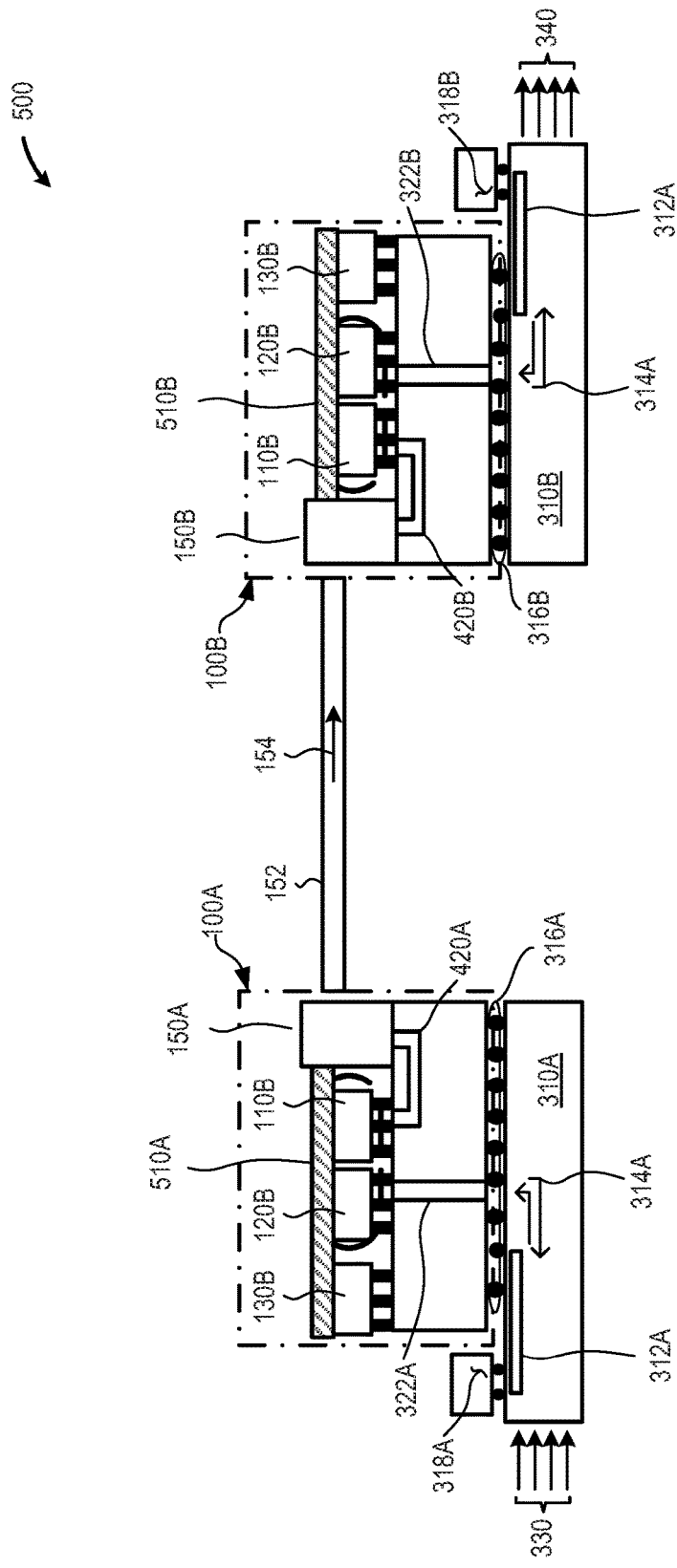
FIG. 5 is an elevation view of yet another example mm-wave waveguide communication system that includes a first mm-wave engine that includes a thermal spreader communicably coupled via one or more mm-wave waveguides to a second mm-wave engine that includes a thermal spreader, in accordance with at least one embodiment described herein.

FIG. 5 is an elevation view of yet another example mm-wave waveguide communication system 500 that includes a first mm-wave engine 100A that includes a thermal spreader 510A communicably coupled via one or more mm-wave waveguides 152A-152n to a second mm-wave engine 100B that includes a thermal spreader 510B, in accordance with at least one embodiment described herein. In embodiments, the first mm-wave engine 100A and the second mm-wave engine 100B may be disposed in the same rack 210. In other embodiments, the first mm-wave engine 100A may be disposed in a first rack 210A and the second mm-wave engine 100B may be disposed in a second rack 210B.

The thermal spreaders 510A and 510B may be mechanically coupled to all or a portion of the mm-wave engine 100A and the mm-wave engine 100B, respectively. In some implementations one or more thermally conductive materials may be disposed between at least a portion of the mm-wave engine 100 and the thermal spreader 510. In other embodiments, the thermal spreaders 510A and 510B may be adhesively coupled to all or a portion of the mm-wave engine 100A and the mm-wave engine 100B, respectively. In such embodiments, the adhesive may have favorable thermal transfer properties that facilitate the flow of thermal energy (i.e., heat) from one or more components included in the mm-wave engine 100 and the thermal spreader 510. In some implementations, the thermal spreader 510 may assist in reducing the temperature of "hot spots" in the mm-wave engine 100 by distributing the heat generated by components at such hot spots over a greater area, thereby improving the dissipation of the thermal energy to the surrounding environment.

The thermal spreader 510 may have more favorable heat dissipation characteristics than the components to which the thermal spreader 510 is attached. For example, the thermal spreader may include fins or similar extended surface features to increase the surface area of the thermal spreader 510, thereby improving the heat dissipation of the thermal spreader 510. It may also dissipate heat more efficiently than the isolated components themselves, additionally aiding to prevent overheating. The thermal spreader 510 may be fabricated using any one of a variety of thermally conductive materials including copper, steel, ceramics, etc., and may be function utilizing any one of a plurality of configurations, including simple passive radiative cooling (either as a single block or utilizing multiple fins or blades), a fan-cooled heat pump, a liquid-cooled system, etc. Although the thermal spreader 510 is included only in FIG. 5 for clarity; similar thermal spreaders 510 may be implemented in any of the various embodiments described herein.

FIG. 6A is an elevation view of yet another example mm-wave waveguide communication system 600A that includes a first mm-wave engine 100A linked to a second mm-wave engine 100B via one or more mm-wave waveguides 152A-152n coupled to mm-wave waveguide connectors 150A, 150B disposed on a first (e.g., upper) surface of the first mm-wave engine 100A and the second mm-wave engine 100B, respectively, in accordance with at least one embodiment described herein. FIG. 6B is an elevation view of yet another example mm-wave waveguide communication system 600B that includes a first mm-wave engine 100A linked to a second mm-wave engine 100B via one or more mm-wave waveguides 152A-152n coupled to mm-wave waveguide connectors 150A, 150B disposed on a second (e.g., lower) surface of the first mm-wave engine 100A and the second mm-wave engine 100B, respectively, in accordance with at least one embodiment described herein. Although the mm-wave engines 100A and 100B are depicted as mirrored in FIGS. 6A and 6B, the mm-wave engines 100A and 100B may of differing construction using any combination of the embodiments described herein.

In embodiments, the first mm-wave engine 100A and the second mm-wave engine 100B may be disposed in the same rack 210. In other embodiments, the first mm-wave engine 100A may be disposed in a first rack 210A and the second mm-wave engine 100B may be disposed in a second rack 210B. Although for ease of discussion the following discussion assumes the first mm-wave engine 100A is functioning as a transmitter and the second mm-wave engine 100B is functioning as a receiver, those of skill in the art will readily appreciate that the first mm-wave engine 100A and the second mm-wave engine 100B may, at times, function as a transmitter, a receiver, or as both a transmitter and a receiver.

As depicted in FIGS. 6A and 6B, the mm-wave transceiver circuitry 110A, the mm-wave MODEM circuitry 120A, and the mm-wave power supply and controller circuitry 130A may be disposed on a second (e.g. lower) surface of the first mm-wave engine 100A. Similarly, the mm-wave transceiver circuitry 110B, the mm-wave MODEM circuitry 120B, and the mm-wave power supply and controller circuitry 130B may be disposed on a second (e.g. lower) surface of the second mm-wave engine 100B.

Referring to system 600A depicted in FIG. 6A, the mm-wave waveguide connector 150A and the mm-wave waveguide connector 150B may be disposed on a first (e.g., upper) surface of the first mm-wave engine 100A and the second mm-wave engine 100B, respectively. Referring now to system 600B depicted in FIG. 6B, the mm-wave waveguide connector 150A and the mm-wave waveguide connector 150B may be disposed on the second (e.g., lower) surface of the first mm-wave engine 100A and the second mm-wave engine 100B, respectively.

FIG. 7A is an elevation view of yet another example mm-wave waveguide communication system 700A that includes a first mm-wave engine 100A linked to a second mm-wave engine 100B via one or more mm-wave waveguides 152A-152n coupled to mm-wave waveguide connectors 750A and 750B disposed in, on, or about a first (e.g., upper) surface of the mm-wave transceiver circuitry 110A and 110B, respectively, in accordance with at least one embodiment described herein. FIG. 7B is an elevation view of yet another example mm-wave waveguide communication system 700B that includes a first mm-wave engine 100A linked to a second mm-wave engine 100B via one or more mm-wave waveguides 152A-152n coupled to mm-wave waveguide connectors 750A, 750B disposed in, on, or about a second (e.g., lower) surface of the mm-wave transceiver circuitry 110A and 110B, respectively, in accordance with at least one embodiment described herein. Although the mm-wave engines 100A and 100B are depicted as mirrored in FIGS. 7A and 7B, the first mm-wave engine 100A and the second mm-wave engine 100B may of differing construction using any combination of the embodiments described herein.

As depicted in FIG. 7A, the mm-wave transceiver circuitry 110A, the mm-wave MODEM circuitry 120A, the mm-wave power supply and controller circuitry 130A, and the mm-wave waveguide connectors 750A may be disposed on a first (e.g. upper) surface of the first mm-wave engine 100A. The mm-wave waveguide connector 750A may be disposed partially or completely in, on, or about the mm-wave transceiver circuitry 110A. For example, the mm-wave waveguide connector 750A may include a structure to accept or accommodate the insertion of the mm-wave waveguide 152 disposed on the upper surface of the mm-wave transceiver circuitry 110A. In another example, the mm-wave waveguide connector 750A may include a structure to accept or accommodate the insertion of the mm-wave waveguide 152 disposed at least partially in the substrate of the mm-wave transceiver circuitry 110A.

Similarly, the mm-wave transceiver circuitry 110B, the mm-wave MODEM circuitry 120B, the mm-wave power supply and controller circuitry 130B, and the mm-wave waveguide connectors 750B may be disposed on a first (e.g. upper) surface of the second mm-wave engine 100B. The mm-wave waveguide connector 750B may be disposed partially or completely in, on, or about the mm-wave transceiver circuitry 110B. For example, the mm-wave waveguide connector 750B may include a structure to accept or accommodate the insertion of the mm-wave waveguide 152 disposed on the upper surface of the mm-wave transceiver circuitry 110B. In another example, the mm-wave waveguide connector 750B may include a structure to accept or accommodate the insertion of the mm-wave waveguide 152 disposed at least partially in the substrate of the mm-wave transceiver circuitry 110B.

Referring now to system 700B depicted in FIG. 7B, the mm-wave transceiver circuitry 110A, the mm-wave MODEM circuitry 120A, the mm-wave power supply and controller circuitry 130A, and the mm-wave waveguide connectors 750A may be disposed on a first (e.g. upper) surface of the first mm-wave engine 100A. The mm-wave waveguide connector 750A may be disposed partially or completely in, on, or about the mm-wave transceiver circuitry 110A. For example, the mm-wave waveguide connector 750A may include a structure to accept or accommodate the insertion of the mm-wave waveguide 152 disposed on a lower surface of the mm-wave transceiver circuitry 110A.

Similarly, the mm-wave transceiver circuitry 110B, the mm-wave MODEM circuitry 120B, the mm-wave power supply and controller circuitry 130B, and the mm-wave waveguide connectors 750B may be disposed on a first (e.g. upper) surface of the second mm-wave engine 100B. The mm-wave waveguide connector 750B may be disposed partially or completely in, on, or about the mm-wave transceiver circuitry 110B. For example, the mm-wave waveguide connector 750B may include a structure to accept or accommodate the insertion of the mm-wave waveguide 152 disposed on a lower surface of the mm-wave transceiver circuitry 110B.

FIG. 8A is a plan view of an example mm-wave waveguide communication system 800 that includes a first mm-wave engine 100A that includes mm-wave transceiver circuitry 110A at least a portion of which includes monolithically integrated III-V semiconductor transceiver circuitry 810A communicably coupled via one or more mm-wave waveguides 152A-152n to a second mm-wave engine 100B that also includes mm-wave transceiver circuitry 110B at least a portion of which includes monolithically integrated III-V semiconductor transceiver circuitry 810B, in accordance with at least one embodiment described herein. FIG. 8B is an elevation view of the example mm-wave waveguide communication system 800 depicted in FIG. 8A, in accordance with at least one embodiment described herein. In embodiments, the first mm-wave engine 100A and the second mm-wave engine 100B may be disposed in the same rack 210. In other embodiments, the first mm-wave engine 100A may be disposed in a first rack 210A and the second mm-wave engine 100B may be disposed in a second rack 210B. Although the following discussion assumes the first mm-wave engine 100A is functioning as a transmitter and the second mm-wave engine 100B is functioning as a receiver for ease of discussion, those of skill in the art will readily appreciate that the first mm-wave engine 100A and the second mm-wave engine 100B may, at times, function as a transmitter, a receiver, or as both a transmitter and a receiver.

The first mm-wave engine 100A may be disposed proximate and communicably coupled via one or more first level interconnects 316A to a substrate 310A to which any number of systems or devices may also be coupled. For example, the substrate 310A may include one or more processors, controllers, or similar semiconductor devices that generate one or more periodic, intermittent, continuous, or aperiodic data streams that includes information and/or data for communication to the second mm-wave engine 100B. In some implementations, the first mm-wave engine 100A may be communicably coupled to a serializer/deserializer ("SERDES") circuitry 312A that receives a plurality of baseband signals (e.g., signals generated by one or more processors or controllers) 330 as an input and generates a serialized output signal that includes information and/or data carried by the received baseband signals. In some implementations, the serialized output signal produced by the SERDES circuitry 312A may be communicated via one or more interconnects 322A to the mm-wave modulation circuitry 122A in the first mm-wave engine 100A. A least a portion of the mm-wave transceiver circuitry 110A may include III-V semiconductor transceiver circuitry 810A.

As depicted in FIG. 8B, the mm-wave transceiver circuitry 110A, the mm-wave MODEM circuitry 120A, and the mm-wave power supply and controller circuitry 130A may be disposed on a first (e.g. upper) surface of the mm-wave engine 100A and the mm-wave waveguide connector 150A may be disposed on a second (e.g., lower) surface of the mm-wave engine 100A. One or more conductors 320A may communicably couple the mm-wave transceiver circuitry 110A to the mm-wave waveguide connector 150A.

The second mm-wave engine 100B may be disposed proximate and communicably coupled via one or more first level interconnects 316B to a substrate 310B to which any number of systems or devices may also be coupled. For example, the substrate 310B may include one or more processors, controllers, or similar semiconductor devices that generate one or more periodic, intermittent, continuous, or aperiodic data streams that includes information and/or data for communication to the first mm-wave engine 100A. The mm-wave transceiver circuitry 110B may include III-V semiconductor transceiver circuitry 810B.

In some implementations, the mm-wave transceiver circuitry 110B receives a mm-wave signal 154 from the first mm-wave engine 100A via one or more mm-wave waveguides 152. The received mm-wave signal 154 includes information and/or data useful to one or more local or remote components, devices, or systems communicably coupled to the substrate 310B. The mm-wave transceiver circuitry 110B passes the received signal to the mm-wave demodulation circuitry 124B in the mm-wave MODEM circuitry 120B. The mm-wave demodulation circuitry 124B separates the received serialized baseband signal containing the data and/or information from the mm-wave carrier signal and generates a serialized output signal. The serialized output signal 142B may be directed via one or more conductors 322B to a SERDES circuitry 312B disposed on the substrate 310B. The SERDES circuitry 312B separates the serialized output signal 142B into a plurality of baseband signals 340.

As depicted in FIG. 8B, the mm-wave transceiver circuitry 110B, the mm-wave MODEM circuitry 120B, and the mm-wave power supply and controller circuitry 130B may be disposed on a first (e.g. upper) surface of the second mm-wave engine 100B and the mm-wave waveguide connector 150B may be disposed on a second (e.g., lower) surface of the second mm-wave engine 100B. One or more conductors 320B may communicably couple the mm-wave transceiver circuitry 110B to the mm-wave waveguide connector 150B.

Figure 9:
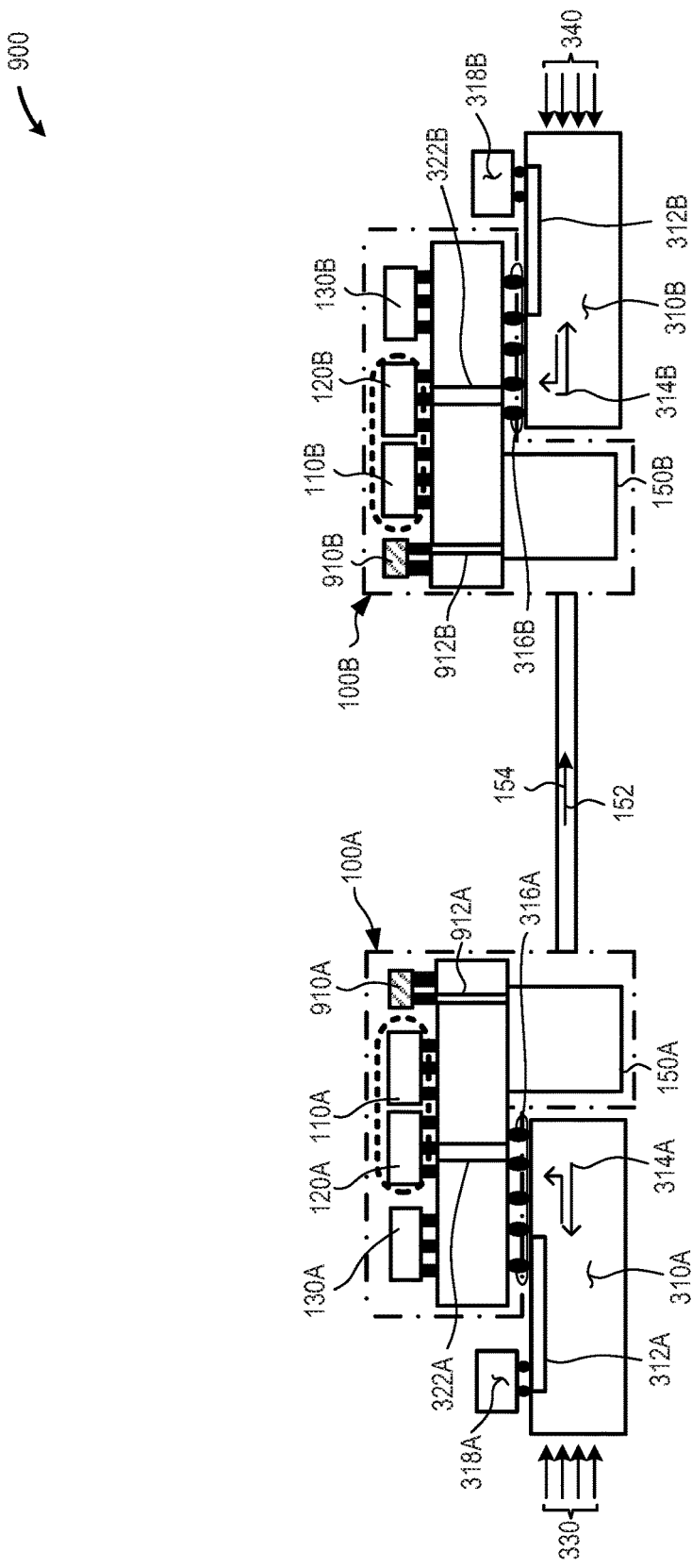
FIG. 9 is an elevation view of an example mm-wave waveguide communication system that includes a first mm-wave engine and a second mm-wave engine, each of which includes respective mm-wave transceiver circuitry and a respective separate die containing III-V semiconductor transceiver circuitry, in accordance with at least one embodiment described herein.

FIG. 9 is an elevation view of an example mm-wave waveguide communication system 900 that includes a first mm-wave engine 100A and a second mm-wave engine 100B, each of which includes respective mm-wave transceiver circuitry 110A and 110B and a respective separate die containing III-V demiconductor transceiver circuitry 910A and 910B, in accordance with at least one embodiment described herein. Interconnects 912A and 912B communicably couple the III-V semiconductor transceiver circuitry 910A and 910B to the respective mm-wave waveguide connector 150A and 150B, disposed on the second (e.g., lower) surface of the respective mm-wave engine package 100A and 100B.

The first mm-wave engine 100A may be disposed proximate and communicably coupled via one or more first level interconnects 316A to a substrate 310A to which any number of systems or devices may also be coupled. For example, the substrate 310A may include one or more processors, controllers, or similar semiconductor devices that generate one or more periodic, intermittent, continuous, or aperiodic data streams that includes information and/or data for communication to the second mm-wave engine 100B. In some implementations, the first mm-wave engine 100A may be communicably coupled to a serializer/deserializer ("SERDES") circuitry 312A that receives a plurality of baseband signals (e.g., signals generated by one or more processors or controllers) 330 as an input and generates a serialized output signal that includes information and/or data carried by the received baseband signals. In some implementations, the serialized output signal produced by the SERDES circuitry 312A may be communicated via one or more interconnects 322A to the mm-wave modulation circuitry 122A in the first mm-wave engine 100A. A least a portion of the mm-wave transceiver circuitry 110A may include III-V semiconductor transceiver circuitry 910A.

As depicted in FIG. 9, the mm-wave transceiver circuitry 110A, the mm-wave III-V semiconductor transceiver circuitry 910A, the mm-wave MODEM circuitry 120A, and the mm-wave power supply and controller circuitry 130A may be disposed on a first (e.g. upper) surface of the first mm-wave engine 100A and the mm-wave waveguide connector 150A may be disposed on a second (e.g., lower) surface of the first mm-wave engine 100A. The second mm-wave engine 100B may be disposed proximate and communicably coupled via one or more first level interconnects 316B to a substrate 310B to which any number of systems or devices may also be coupled. For example, the substrate 310B may include one or more processors, controllers, or similar semiconductor devices that generate one or more periodic, intermittent, continuous, or aperiodic data streams that includes information and/or data for communication to the first mm-wave engine 100A. The mm-wave transceiver circuitry 110B may include III-V semiconductor transceiver circuitry 910B.

In some implementations, the mm-wave transceiver circuitry 110B receives a mm-wave signal 154 from the first mm-wave engine 100A via one or more mm-wave waveguides 152. The received mm-wave signal 154 includes information and/or data useful to one or more local or remote components, devices, or systems communicably coupled to the substrate 310B. The mm-wave transceiver circuitry 110B passes the received signal to the mm-wave MODEM circuitry 120B. The mm-wave MODEM circuitry 120B separates the received serialized baseband signal containing the data and/or information from the mm-wave carrier signal and generates a serialized output signal 142B. The serialized output signal 142B may be directed via one or more conductors 322B to a SERDES circuitry 312B disposed on the substrate 310B. The SERDES circuitry 312B separates the serialized output signal 142B into a plurality of baseband signals 340.

Figure 10:
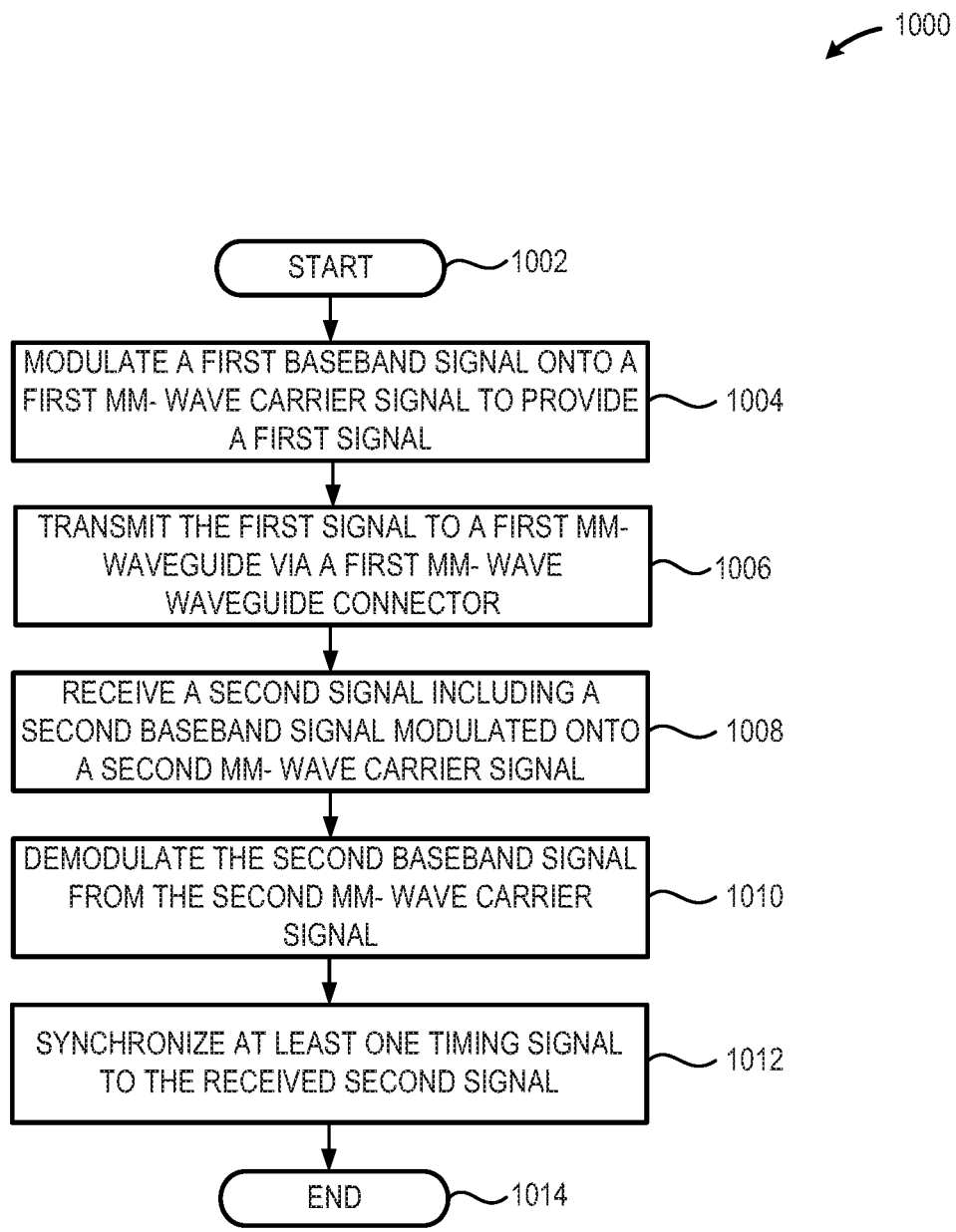
FIG. 10 is a high-level logic flow diagram of an illustrative method of communicating between mm-wave engines using a mm-wave waveguide, in accordance with at least one embodiment described herein.

FIG. 10 is a high-level logic flow diagram of an illustrative method 1000 of communicating between mm-wave engines 100A, 100B using a mm-wave waveguide 152, in accordance with at least one embodiment described herein. The method 1000 commences at 1002.

At 1004, mm-wave MODEM circuitry 120A modulates a first baseband signal 314 onto a first mm-wave carrier signal to provide a first signal 154A. In embodiments, serializer/deserializer circuitry 312 may generate the first baseband signal 330 using information and/or data provided or otherwise carried by a plurality of signals from one or more components (e.g., controllers, storage controllers, memory controllers, processors, microprocessors, and similar) that are temporarily or permanently communicably coupled to the mm-wave engine 100A. In some implementations, the first mm-wave carrier signal may include a signal having a frequency of from about 30 GHz to about 900 GHz.

At 1006, the mm-wave MODEM circuitry 120A communicates the first signal 154A to the mm-wave transceiver 120A for transmission to a mm-wave waveguide 152A. In some implementations, the mm-wave transceiver 110A may communicate the first signal 154A to the mm-wave waveguide 152A via one or more mm-wave waveguide connectors 150A-150n. In some implementations, the mm-wave transceiver circuitry 110A may be fabricated, at least in part, using III-V semiconductor fabrication techniques to beneficially improve the power of the transmitted first signal 154A and/or the transmission range of the first signal 154A. In some implementations, all or a portion of the one or more mm-wave waveguide connectors 150 may be disposed in, on, or about one or more surfaces of the mm-wave engine package. In some implementations, all or a portion of the one or more mm-wave waveguide connectors 150 may be disposed in, on, or about the mm-wave transceiver 110A.

At 1008, the mm-wave transceiver 110A receives a second signal 154B that includes a second baseband signal 340 modulated onto a second mm-wave carrier signal. In some implementations, the second signal 154B may be received from the same mm-wave waveguide 152A along which the first signal 154A is propagated. In some implementations, the second signal 154B may be communicated by a different mm-wave waveguide 152B than the mm-wave waveguide 152A along which the first signal 154A is propagated. In some implementations, the second mm-wave carrier signal may include a carrier signal having a frequency of from about 30 GHz to about 900 GHz.

At 1010, the mm-wave transceiver 110A forwards the received second signal 154B to the mm-wave MODEM circuitry 120A. The mm-wave MODEM circuitry 120A demodulates or otherwise separates the second baseband signal 340 from the second mm-wave carrier signal. The second baseband signal 340 may include a serialized second baseband signal containing or otherwise conveying information and/or data from each of a plurality of baseband signal sources.

At 1012, the mm-wave MODEM circuitry 120A synchronizes at least the received second baseband signal 340 to a timing signal. In some implementations, the synchronization may be performed using CDR circuitry 126. In some implementations, the CDR circuitry 126 may include one or more phase-locked loop (PLL) tuners. In some implementations, the CDR circuitry 126 may include equalization circuitry. The method 1000 concludes at 1014.

While FIG. 10 illustrates various operations according to one or more embodiments, it is to be understood that not all of the operations depicted in FIG. 10 are necessary for other embodiments. Indeed, it is fully contemplated herein that in other embodiments of the present disclosure, the operations depicted in FIG. 10, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Thus, the present disclosure is directed to systems and methods for communicating between rack mounted devices disposed in the same or different racks separated by distances of less than a meter to a few tens of meters. The system includes a CMOS first mm-wave engine that includes mm-wave transceiver circuitry, mm-wave MODEM circuitry, power distribution and control circuitry, and a mm-wave waveguide connector. The CMOS first mm-wave engine communicably couples to a CMOS second mm-wave engine that also includes mm-wave transceiver circuitry, mm-wave MODEM circuitry, power distribution and control circuitry, and a mm-wave waveguide connector. In some implementations, at least a portion of the mm-wave transceiver circuitry may be fabricated using III-V semiconductor manufacturing methods.

The following examples pertain to further embodiments. The following examples of the present disclosure may comprise subject material such as at least one device, a method, at least one machine-readable medium for storing instructions that when executed cause a machine to perform acts based on the method, means for performing acts based on the method and/or a system for communicating between CMOS mm-wave engines disposed on rack mounted devices over distances of from less than a meter to a few tens of meters.

According to example 1, there is provided a complementary metal oxide semiconductor (CMOS) die mounted millimeter wave (mm-wave) package. The package may include a substrate; CMOS mm-wave modulation circuitry operably coupled to the substrate, the mm-wave modulation circuitry to modulate a first baseband signal onto a first mm-wave carrier signal to provide a first signal; CMOS mm-wave demodulation circuitry operably coupled to the substrate, the mm-wave demodulation circuitry to demodulate a second baseband signal from a second mm-wave carrier signal; CMOS clock data recovery circuitry operably coupled to the substrate and communicably coupled to the CMOS mm-wave demodulation circuitry, the clock data recovery circuitry to recover timing information from the second baseband signal; CMOS mm-wave transmitter circuitry to: receive the first signal from the CMOS mm-wave modulation circuitry; and provide the first signal to a first mm-wave waveguide member; and CMOS mm-wave receiver circuitry.

Example 2 may include elements of example 1 where at least one of: the CMOS mm-wave transmitter circuitry and the CMOS mm-wave receiver circuitry includes III-V semiconductor circuitry.

Example 3 may include elements of example 2 where at least one of: the CMOS mm-wave transmitter circuitry and the CMOS mm-wave receiver circuitry includes: a communicably coupled III-V semiconductor circuitry die.

Example 4 may include elements of example 2 where at least one of: the CMOS mm-wave transmitter circuitry and the CMOS mm-wave receiver circuitry includes: a monolithically integrated III-V semiconductor circuitry die.

Example 5 may include elements of example 1 and the system may additionally include a first mm-wave waveguide connector: where CMOS mm-wave transceiver circuitry communicably coupled to the first mm-wave waveguide connector includes the CMOS mm-wave transmitter circuitry and the CMOS mm-wave receiver circuitry, the CMOS mm-wave transceiver circuitry to: receive the first signal from the CMOS mm-wave modulation circuitry; provide the first signal to a first mm-wave waveguide member via the first mm-wave waveguide connector; receive a second signal from the first mm-wave waveguide member via the first mm-wave waveguide connector; and provide the second signal to the CMOS mm-wave demodulation circuitry.

Example 6 may include elements of example 5 where the CMOS mm-wave transceiver circuitry includes III-V semiconductor mm-wave transceiver circuitry.

Example 7 may include elements of example 6 where the III-V semiconductor mm-wave transceiver circuitry comprises a III-V semiconductor mm-wave transceiver circuitry die communicably coupled to the CMOS mm-wave transceiver circuitry.

Example 8 may include elements of example 6 where the III-V semiconductor mm-wave transceiver circuitry comprises a III-V semiconductor mm-wave transceiver circuitry die monolithically integrated with the CMOS mm-wave transceiver circuitry.

Example 9 may include elements of example 5 where the first mm-wave waveguide connector comprises a first mm-wave waveguide disposed at least partially in the substrate.

Example 10 may include elements of example 5 where the first mm-wave waveguide connector comprises a first mm-wave waveguide physically coupled to the CMOS mm-wave transceiver circuitry.

Example 11 may include elements of example 1, and the system may further include a first mm-wave waveguide connector communicably coupled to the CMOS mm-wave transmitter circuitry, the CMOS mm-wave transmitter circuitry to: receive the first signal from the CMOS mm-wave modulation circuitry; and provide the first signal to a first mm-wave waveguide member via the first mm-wave waveguide connector; and a second mm-wave waveguide connector communicably coupled to the CMOS mm-wave receiver circuitry, the CMOS mm-wave receiver circuitry to: receive a second signal from a second mm-wave waveguide communicably coupled to the CMOS mm-wave receiver circuitry via the second mm-wave waveguide connector; and provide the received second signal to the CMOS mm-wave demodulation circuitry.

Example 12 may include elements of example 11 where the first mm-wave waveguide connector comprises a first mm-wave waveguide connector disposed at least partially in the substrate; and the second mm-wave waveguide connector comprises a second mm-wave waveguide connector disposed at least partially in the substrate.

Example 13 may include elements of example 11 where the first mm-wave waveguide connector comprises a first mm-wave waveguide connector disposed in or on the CMOS mm-wave transmitter circuitry; and the second mm-wave waveguide connector comprises a second mm-wave waveguide connector disposed in or on the CMOS mm-wave receiver circuitry.

Example 14 may include elements of any of examples 1 through 13, and the system may further include CMOS power supply and management circuitry operably coupled to the substrate.

Example 15 may include elements of any of examples 1 through 13, and the system may further include CMOS clock data recovery circuitry that includes phase-locked loop (PLL) clock data recovery circuitry.

Example 16 may include elements of any of examples 1 through 13 where the CMOS mm-wave modulation circuitry provides a first mm-wave carrier signal having a frequency of from about 30 GHz to about 900 GHz.

According to example 17, there is provided a method of communicating via millimeter wave (mm-wave) signals using a complementary metal oxide semiconductor (CMOS) mm-wave package. The method may include: modulating, via CMOS mm-wave modulation circuitry, a first baseband signal onto a first mm-wave carrier signal to provide a first signal; and transmitting, via CMOS mm-wave transmitter circuitry coupled to the CMOS mm-wave modulation circuitry, the first signal to a first mm-wave waveguide via a first mm-wave waveguide connector operably coupled to the CMOS mm-wave transmitter circuitry.

Example 18 may include elements of example 17 where modulating, via CMOS mm-wave modulation circuitry, a first baseband signal onto a first mm-wave carrier signal to provide a first signal may include modulating, via CMOS mm-wave modulation circuitry, a first baseband signal onto a first mm-wave carrier signal having a frequency of from about 30 GHz to about 900 GHz to provide a first signal having a frequency of from about 30 GHz to about 900 GHz.

Example 19 may include elements of example 17 where transmitting the first signal to a first mm-wave waveguide via a first mm-wave waveguide connector physically coupled to the substrate and operably coupled to the CMOS mm-wave modulation circuitry may include: transmitting, via CMOS mm-wave transmitter circuitry coupled to the CMOS mm-wave modulation circuitry, the first signal to a first mm-wave waveguide via a first mm-wave waveguide connector disposed at least partially in the substrate and communicably coupled to the CMOS mm-wave transmitter circuitry.

Example 20 may include elements of example 17 where transmitting the first signal to a first mm-wave waveguide via a first mm-wave waveguide connector physically coupled to the substrate and operably coupled to the CMOS mm-wave modulation circuitry may include transmitting, via CMOS mm-wave transmitter circuitry coupled to the CMOS mm-wave modulation circuitry, the first signal to a first mm-wave waveguide via a first mm-wave waveguide connector disposed in or on the CMOS mm-wave transmitter circuitry.

Example 21 may include elements of example 17 where transmitting, via CMOS mm-wave transmitter circuitry, the first signal to a first mm-wave waveguide may include transmitting the first signal to a first mm-wave waveguide via CMOS mm-wave transmitter circuitry that includes a communicably coupled III-V semiconductor circuitry die.

Example 22 may include elements of example 17 where transmitting, via CMOS mm-wave transmitter circuitry, the first signal to a first mm-wave waveguide may include transmitting the first signal to a first mm-wave waveguide via CMOS mm-wave transmitter circuitry that includes a monolithically integrated III-V semiconductor circuitry die.

Example 23 may include elements of example 17, and the method may further include receiving, via CMOS mm-wave receiver circuitry, a second signal, the second signal including a second baseband signal modulated onto a second mm-wave carrier signal; demodulating, via CMOS mm-wave demodulation circuitry, the second baseband signal from the second mm-wave carrier signal; and synchronizing, via CMOS clock data recovery circuitry operably coupled to the substrate and communicably coupled to the CMOS mm-wave demodulation circuitry, at least one timing signal to the received second signal.

Example 24 may include elements of example 21 where demodulating, via CMOS mm-wave demodulation circuitry, the second baseband signal from the second mm-wave carrier signal may include demodulating, via CMOS mm-wave demodulation circuitry, the second baseband signal from the second mm-wave carrier signal having a frequency of from about 30 GHz to about 900 GHz.

Example 25 may include elements of example 21 where receiving, via CMOS mm-wave receiver circuitry, a second signal, the second signal including a second baseband signal modulated onto a second mm-wave carrier signal may include receiving, from a second mm-wave waveguide via a second mm-wave waveguide connector, the second signal including the second baseband signal modulated onto the second mm-wave carrier signal, the second mm-wave waveguide connector communicably coupled to the CMOS mm-wave receiver circuitry.

Example 26 may include elements of example 21 where receiving, via CMOS mm-wave receiver circuitry, a second signal, the second signal including a second baseband signal modulated onto a second mm-wave carrier signal may include receiving, from the first mm-wave waveguide via the first mm-wave waveguide connector, the second signal, the first mm-wave waveguide connector communicably coupled to the CMOS mm-wave receiver circuitry.

Example 27 may include elements of example 24 where transmitting the first signal to a first mm-wave waveguide via a first mm-wave waveguide connector operably coupled to the CMOS mm-wave transmitter circuitry may include transmitting, via CMOS mm-wave transceiver circuitry coupled to the CMOS mm-wave modulation circuitry, the first signal to the first mm-wave waveguide via the first mm-wave waveguide connector, the first mm-wave waveguide connector operably coupled to the CMOS mm-wave transceiver circuitry; and receiving, via CMOS mm-wave receiver circuitry, a second signal, the second signal including a second baseband signal modulated onto a second mm-wave carrier signal may include receiving, from the first mm-wave waveguide by the CMOS mm-wave transceiver circuitry via the first mm-wave waveguide connector, the second signal.

Example 28 may include elements of example 25 where transmitting the first signal to the first mm-wave waveguide may include transmitting, by the CMOS mm-wave transmitter circuitry, a first signal having a first polarization to the first mm-wave waveguide; and receiving the second signal from the first mm-wave waveguide may include receiving, by the CMOS mm-wave receiver circuitry, a second signal having a second polarization from the first mm-wave waveguide.

Example 29 may include elements of example 21 where transmitting the first signal via CMOS mm-wave transmitter circuitry may include transmitting the first signal via CMOS mm-wave transceiver circuitry; and receiving the second signal via CMOS mm-wave receiver circuitry may include receiving the second signal via the CMOS mm-wave transceiver circuitry.

Example 30 may include elements of example 29 where transmitting the first signal via CMOS mm-wave transmitter circuitry may include transmitting the first signal via III-V semiconductor mm-wave transceiver circuitry; and receiving the second signal via the CMOS mm-wave transceiver circuitry may include: receiving the second signal via the III-V semiconductor mm-wave transceiver circuitry.

According to example 31, there is provided a system for communicating via millimeter wave (mm-wave) signals using a complementary metal oxide semiconductor (CMOS)

mm-wave package. The system may include: CMOS means for modulating a first baseband signal onto a first mm-wave carrier signal to provide a first signal; CMOS means for transmitting the first signal to a first mm-wave waveguide via an operably coupled first mm-wave waveguide connector; CMOS means for receiving a second signal including a second baseband signal modulated onto a second mm-wave carrier signal; CMOS means for demodulating the second baseband signal from the second mm-wave carrier signal; and CMOS means for synchronizing at least one timing signal to the received second signal.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A millimeter wave (mm-wave) package, comprising:
a substrate;
complementary metal oxide semiconductor (CMOS) mm-wave modulation circuitry operably coupled to the substrate, the mm-wave modulation circuitry to modulate a first baseband signal onto a first mm-wave carrier signal to provide a first signal;
CMOS mm-wave demodulation circuitry operably coupled to the substrate, the mm-wave demodulation circuitry to demodulate a second baseband signal from a second mm-wave carrier signal;
CMOS clock data recovery circuitry operably coupled to the substrate and communicably coupled to the CMOS mm-wave demodulation circuitry, the clock data recovery circuitry to recover timing information from the second baseband signal;
CMOS mm-wave transmitter circuitry to:
receive the first signal from the CMOS mm-wave modulation circuitry; and
provide the first signal to a first mm-wave waveguide member;
CMOS mm-wave receiver circuitry.

2. The mm-wave package of claim 1 wherein at least one of: the CMOS mm-wave transmitter circuitry and the CMOS mm-wave receiver circuitry includes III-V semiconductor circuitry.

3. The mm-wave package of claim 2 wherein at least one of: the CMOS mm-wave transmitter circuitry and the CMOS mm-wave receiver circuitry includes: a communicably coupled III-V semiconductor circuitry die.

4. The mm-wave package of claim 2 wherein at least one of: the CMOS mm-wave transmitter circuitry and the CMOS mm-wave receiver circuitry includes: a monolithically integrated III-V semiconductor circuitry die.

5. The mm-wave package of claim 1, further comprising a first mm-wave waveguide connector:
wherein CMOS mm-wave transceiver circuitry communicably coupled to the first mm-wave waveguide connector includes the CMOS mm-wave transmitter circuitry and the CMOS mm-wave receiver circuitry, the CMOS mm-wave transceiver circuitry to:
receive the first signal from the CMOS mm-wave modulation circuitry;
provide the first signal to a first mm-wave waveguide member via the first mm-wave waveguide connector;
receive a second signal from the first mm-wave waveguide member via the first mm-wave waveguide connector; and
provide the second signal to the CMOS mm-wave demodulation circuitry.

6. The mm-wave package of claim 5 wherein the CMOS mm-wave transceiver circuitry includes III-V semiconductor mm-wave transceiver circuitry.

7. The mm-wave package of claim 6 wherein the III-V semiconductor mm-wave transceiver circuitry comprises at least one of: a III-V semiconductor mm-wave transceiver circuitry die communicably coupled to the CMOS mm-wave transceiver circuitry or a III-V semiconductor mm-wave transceiver circuitry die monolithically integrated with the CMOS mm-wave transceiver circuitry.

8. The mm-wave package of claim 5, the first mm-wave waveguide connector disposed at least partially in the substrate.

9. The mm-wave package of claim 5, the first mm-wave waveguide connector physically coupled to the CMOS mm-wave transceiver circuitry.

10. The mm-wave package of claim 1, further comprising:
a first mm-wave waveguide connector communicably coupled to the CMOS mm-wave transmitter circuitry, the CMOS mm-wave transmitter circuitry to
receive the first signal from the CMOS mm-wave modulation circuitry; and
provide the first signal to a first mm-wave waveguide member via the first mm-wave waveguide connector; and
a second mm-wave waveguide connector communicably coupled to the CMOS mm-wave receiver circuitry, the CMOS mm-wave receiver circuitry to:
receive a second signal from a second mm-wave waveguide communicably coupled to the CMOS mm-wave receiver circuitry via the second mm-wave waveguide connector; and
provide the received second signal to the CMOS mm-wave demodulation circuitry.

11. The mm-wave package of claim 10:
the first mm-wave waveguide connector disposed at least partially in the substrate; and
the second mm-wave waveguide connector disposed at least partially in the substrate.

12. The mm-wave package of claim 10:
the first mm-wave waveguide connector disposed in or on the CMOS mm-wave transmitter circuitry; and
the second mm-wave waveguide connector disposed in or on the CMOS mm-wave receiver circuitry.

13. The mm-wave package of claim 1, further comprising CMOS power supply and management circuitry operably coupled to the substrate.

14. The mm-wave package of claim 1 wherein the CMOS clock data recovery circuitry includes phase-locked loop (PLL) clock data recovery circuitry.

15. The mm-wave package of claim 1 wherein the CMOS mm-wave modulation circuitry, the CMOS mm-wave demodulation circuitry, the CMOS clock data recovery, the CMOS mm-wave transmitter, and the CMOS mm-wave receiver circuitry are implemented in a single CMOS die.

16. The mm-wave package of claim 1 wherein the CMOS mm-wave modulation circuitry, the CMOS mm-wave demodulation circuitry, the CMOS clock data recovery, the CMOS mm-wave transmitter, and the CMOS mm-wave receiver circuitry are from a plurality of semiconductor nodes.

17. The mm-wave package of claim 1 wherein at least one of the CMOS mm-wave transmitter, and the CMOS mm-wave receiver circuitry include circuitry to operate in a frequency band of from about 30 GHz to about 900 GHz.

18. A method of communicating via millimeter wave (mm-wave) signals using a complementary metal oxide semiconductor (CMOS) mm-wave package, the method comprising:
modulating, via CMOS mm-wave modulation circuitry, a first baseband signal onto a first mm-wave carrier signal to provide a first signal;
transmitting, via CMOS mm-wave transmitter circuitry coupled to the CMOS mm-wave modulation circuitry, the first signal to a first mm-wave waveguide via a first mm-wave waveguide connector operably coupled to the CMOS mm-wave transmitter circuitry;
receiving a second signal including a second baseband signal modulated onto a second mm-wave carrier signal via CMOS mm-wave receiver circuitry;
demodulating, via CMOS mm-wave demodulation circuitry, the second baseband signal from the second mm-wave carrier signal; and
synchronizing the received second signal to at least one timing signal via CMOS clock data recovery circuitry operably coupled to the substrate and communicably coupled to the CMOS mm-wave demodulation circuitry.

19. The method of claim 18 wherein transmitting the first signal to a first mm-wave waveguide via a first mm-wave waveguide connector physically coupled to the substrate and operably coupled to the CMOS mm-wave modulation circuitry comprises:
transmitting the first signal to at least one of:
a first mm-wave waveguide via a first mm-wave waveguide connector disposed at least partially in the substrate and communicably coupled to the CMOS mm-wave transmitter circuitry; or
a first mm-wave waveguide via a first mm-wave waveguide connector at least partially disposed in or on the CMOS mm-wave transmitter circuitry.

20. The method of claim 18 wherein transmitting the first signal to a first mm-wave waveguide via CMOS mm-wave transmitter circuitry, comprises:
transmitting the first signal to a first mm-wave waveguide via CMOS mm-wave transmitter circuitry that includes at least one of: a communicably coupled III-V semiconductor transmitter circuitry die or a monolithically integrated III-V semiconductor transmitter circuitry die.

21. The method of claim 18 wherein receiving a second signal including a second baseband signal modulated onto a second mm-wave carrier signal via CMOS mm-wave receiver circuitry comprises:
receiving a second signal including a second baseband signal modulated onto a second mm-wave carrier signal via CMOS mm-wave receiver circuitry that includes at least one of: a communicably coupled III-V semiconductor receiver circuitry die or a monolithically integrated III-V semiconductor receiver circuitry die.

22. The method of claim 18 wherein receiving, via CMOS mm-wave receiver circuitry, a second signal, the second signal including a second baseband signal modulated onto a second mm-wave carrier signal comprises at least one of:
receiving the second signal from a second mm-wave waveguide via a second mm-wave waveguide connector, the second mm-wave waveguide connector communicably coupled to the CMOS mm-wave receiver circuitry; or
receiving the second signal from the first mm-wave waveguide via the first mm-wave waveguide connector, the first mm-wave waveguide connector communicably coupled to the CMOS mm-wave receiver circuitry.

23. The method of claim 22 wherein:
transmitting the first signal to a first mm-wave waveguide via a first mm-wave waveguide connector operably coupled to the CMOS mm-wave transmitter circuitry comprises:
transmitting, via CMOS mm-wave transceiver circuitry coupled to the CMOS mm-wave modulation circuitry, the first signal to the first mm-wave waveguide via the first mm-wave waveguide connector, the first mm-wave waveguide connector operably coupled to the CMOS mm-wave transceiver circuitry; and
receiving, via CMOS mm-wave receiver circuitry, a second signal, the second signal including a second baseband signal modulated onto a second mm-wave carrier signal comprises:
receiving the second signal from the first mm-wave waveguide by the CMOS mm-wave transceiver circuitry via the first mm-wave waveguide connector.

24. The method of claim 18 wherein:
transmitting the first signal via CMOS mm-wave transmitter circuitry comprises at least one of:
transmitting the first signal via CMOS mm-wave transceiver circuitry; or
transmitting the first signal via III-V semiconductor mm-wave transceiver circuitry; and
receiving the second signal via CMOS mm-wave receiver circuitry comprises at least one of:
receiving the second signal via the CMOS mm-wave transceiver circuitry; or
receiving the second signal via the III-V semiconductor mm-wave transceiver circuitry.

25. A system for communicating via millimeter wave (mm-wave) signals using a complementary metal oxide semiconductor (CMOS) mm-wave package, the system comprising:
CMOS means for modulating a first baseband signal onto a first mm-wave carrier signal to provide a first signal;
CMOS means for transmitting the first signal to a first mm-wave waveguide via an operably coupled first mm-wave waveguide connector;
CMOS means for receiving a second signal including a second baseband signal modulated onto a second mm-wave carrier signal;
CMOS means for demodulating the second baseband signal from the second mm-wave carrier signal; and
CMOS means for synchronizing at least one timing signal to the received second signal.

* * * * *